US011854310B2

(12) United States Patent
Cao et al.

(10) Patent No.: US 11,854,310 B2
(45) Date of Patent: Dec. 26, 2023

(54) FACE LIVENESS DETECTION METHOD AND RELATED APPARATUS

(71) Applicant: Tencent Technology (Shenzhen) Company Limited, Shenzhen (CN)

(72) Inventors: Xuan Cao, Shenzhen (CN); Shouhong Ding, Shenzhen (CN); Jia Meng, Shenzhen (CN); Taiping Yao, Shenzhen (CN); Yanhao Ge, Shenzhen (CN); Chengjie Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 49 days.

(21) Appl. No.: 17/580,548

(22) Filed: Jan. 20, 2022

(65) Prior Publication Data

US 2022/0148336 A1 May 12, 2022

Related U.S. Application Data

(63) Continuation of application No. PCT/CN2020/120105, filed on Oct. 10, 2020.

(30) Foreign Application Priority Data

Jan. 17, 2020 (CN) .......................... 202010055343.3

(51) Int. Cl.
*G06V 40/40* (2022.01)
*G06V 40/16* (2022.01)
(Continued)

(52) U.S. Cl.
CPC .............. *G06V 40/45* (2022.01); *G06V 10/14* (2022.01); *G06V 40/166* (2022.01); *G06V 40/168* (2022.01); *G06V 40/63* (2022.01)

(58) Field of Classification Search
CPC ...... G06V 40/45; G06V 10/14; G06V 40/166; G06V 40/168; G06V 40/63; G06V 10/141;
(Continued)

(56) References Cited

U.S. PATENT DOCUMENTS

2008/0112596 A1* 5/2008 Rhoads .................. G06T 1/005
382/115
2010/0134250 A1 6/2010 Chung et al.
(Continued)

FOREIGN PATENT DOCUMENTS

CN    105488486 A    4/2016
CN    105518711 A    4/2016
(Continued)

OTHER PUBLICATIONS

Tencent Technology, ISR, PCT/CN2020/120105, dated Jan. 12, 2021, 2 pgs.
(Continued)

*Primary Examiner* — Nimesh Patel
(74) *Attorney, Agent, or Firm* — Morgan, Lewis & Bockius LLP

(57) ABSTRACT

A face liveness detection method is performed by an electronic device. The method includes: obtaining an initial face image of an object and a face image set of the object captured at N different illumination directions; obtaining N difference images according to the initial face image and the N face images in the face image set; generating a normal map and an albedo map according to the N difference images and the N illumination directions; and determining a face liveness detection result according to the N difference images, the normal map, and the albedo map, the face liveness detection result indicating whether the object has a live face or not. In this application, three-dimensional (3D)
(Continued)

geometric information and surface material information of a face image are considered, thereby recognizing the authenticity of the face image, and effectively resisting different face liveness attack manners.

20 Claims, 11 Drawing Sheets

(51) Int. Cl.
*G06V 10/14* (2022.01)
*G06V 40/60* (2022.01)

(58) Field of Classification Search
CPC .............. G06V 40/165; G06V 40/172; G06V 40/161; G06V 40/171; G06V 40/16; G06V 10/143; G06V 40/18; G06V 10/145; G06V 40/19; G06V 40/70; G06V 10/40; G06V 10/82; G06V 40/197; G06V 20/64; G06V 40/40; G06V 30/19173; G06V 40/1365; G06V 40/162; G06V 10/60; G06V 40/67; G06V 10/70; G06V 20/52; G06V 40/174; G06V 10/20; G06V 10/24; G06V 40/1388; G06V 2201/12; G06V 40/1394; G06V 20/653; G06V 20/647; G06V 40/1347; G06V 20/46; G06V 2201/121; G06V 30/1431; G06V 30/1801; G06V 30/18124; G06V 40/176; G06V 40/20; G06N 3/045; G06N 3/08; G06N 3/04; G06N 3/044; H04L 63/0861; H04L 63/105; H04L 9/3231; H04L 63/08; H04L 63/101; H04L 67/306; G06F 21/32; G06F 18/22; G06F 18/214; G06F 21/31; G06F 21/445; G06F 2221/2129; G06F 18/24; G06F 18/00; G06F 18/251; G06F 2221/2117; G06F 3/013; G06F 18/21342; G06F 18/241; G06F 18/256; G06F 2221/2133; G06F 3/017; G06T 2207/30201; G06T 2207/10048; G06T 5/50; G06T 7/50; G06T 7/80; G06T 2207/10004; G06T 2207/10024; G06T 2207/10028; G06T 7/55; G06T 7/60; G06T 2207/30196; G06T 7/20; G06T 1/00; G06T 2207/20081; G06T 2207/20172; G06T 2207/20216; G06T 2207/20221; G06T 7/00; G06T 17/00; G06T 15/005; G06T 7/70; G06T 19/20; G06T 7/248; G06T 7/97; G06T 13/40; G06T 2207/10012; G06T 2207/10016; G06T 7/593; G06T 7/73; G06T 15/50; G06T 2207/20084; G06T 2207/10032; G06T 7/0012; G06T 7/586; G06T 7/74; G06T 15/00; G06T 15/506; G06T 2207/20112; G06T 7/246; G05B 13/0265; G05B 19/4155; G05B 2219/40408; G05B 19/4099; G05B 13/048
See application file for complete search history.

(56) References Cited

U.S. PATENT DOCUMENTS

| | | | |
|---|---|---|---|
| 2012/0268571 A1* | 10/2012 | Debevec | G06T 7/586 348/48 |
| 2017/0046563 A1 | 2/2017 | Kim et al. | |
| 2018/0173979 A1* | 6/2018 | Fan | G06V 40/172 |
| 2019/0213309 A1* | 7/2019 | Morestin | G01S 17/04 |
| 2020/0380244 A1* | 12/2020 | Zhou | G06V 10/145 |

FOREIGN PATENT DOCUMENTS

| | | |
|---|---|---|
| CN | 106203305 A | 12/2016 |
| CN | 106446768 A | 2/2017 |
| CN | 110110597 A | 8/2019 |
| CN | 111310575 A | 6/2020 |

OTHER PUBLICATIONS

Tencent Technology, WO, PCT/CN2020/120105, Jan. 12, 2021, 4 pgs.
Tencent Technology, IPRP, PCT/CN2020/120105, dated Jul. 19, 2022, 5 pgs.
Akinori F. Ebihara et al., "Specular- and Diffuse-reflection-based Face Spoofing Detection for Mobile Devices", Arxiv.org, Cornell University Library, Jul. 29, 2019, XP081500965, 11 pgs.
Extended European Search Report, EP20914529.1, dated Nov. 7, 2022, 9 pgs.
J. Matias Di Martino et al., "Liveness Detection Using Implicit 3D Features", Arxiv.org, Cornell University Library, Apr. 18, 2018, XP080872054, 21 pgs.

* cited by examiner

Initial face image P0  Initial face image P1  Initial face image P2  Initial face image P3

(a)

Face key point set S0  Face key point set S1  Face key point set S2  Face key point set S3

(b)

Normal map  Albedo map

FACE LIVENESS DETECTION METHOD AND RELATED APPARATUS

CROSS-REFERENCE TO RELATED APPLICATIONS

This application is a continuation application of PCT Patent Application No. PCT/CN2020/120105, entitled "FACE LIVENESS DETECTION METHOD AND RELATED APPARATUS" filed on Oct. 10, 2020, which claims priority to Chinese Patent Application No. 202010055343.3, filed with the State Intellectual Property Office of the People's Republic of China on Jan. 17, 2020, and entitled "FACE LIVENESS DETECTION METHOD AND RELATED APPARATUS, DEVICE, AND STORAGE MEDIUM", all of which are incorporated herein by reference in their entirety.

FIELD OF THE TECHNOLOGY

This application relates to the field of artificial intelligence (AI), and in particular, to face liveness detection.

BACKGROUND OF THE DISCLOSURE

The main purpose of face liveness detection is to determine whether the current face is a real living person, so as to resist attacks of fake faces. Face liveness detection is an important step before face recognition. With the application of face recognition in many important fields such as face payment and face access control, the problem of using fake faces to attack face recognition has become increasingly severe, and face liveness detection is the main technology path to resist attacks of fake faces.

Currently, a plurality of face images are mainly used as the basis for face liveness detection. For example, if a face in a face image satisfies a motion feature such as blinking or opening a mouth, it is determined that the face in the image is a live face.

SUMMARY

Embodiments of this application provide a face liveness detection method and a related apparatus, so that a normal map and an albedo map of a face image can be calculated by using incident light in different directions to illuminate a face, and in addition, three-dimensional (3D) geometric information and surface material information of the face image are considered, thereby recognizing the authenticity of the face image, and effectively resisting different face liveness attack manners.

According to an aspect, the embodiments of this application provide a face liveness detection method performed by an electronic device, the method including:
 obtaining an initial face image of an object and a face image set of the object, the face image set comprising N face images of the object captured according to N illumination directions, the N illumination directions corresponding to N light source positions, the N light source positions being not on a same straight line, and N being an integer greater than or equal to 3;
 obtaining N difference images according to the initial face image and the N face images in the face image set;
 generating a normal map and an albedo map according to the N difference images and the N illumination directions, the normal map being an image formed based on normals corresponding to pixels, and the albedo map being an image formed based on albedos corresponding to the pixels; and
 determining a face liveness detection result according to the N difference images, the normal map, and the albedo map, wherein the face liveness detection result indicates whether the object has a live face or not.

According to another aspect, the embodiments of this application provide an electronic device, including a memory and a processor,
 the memory being configured to store a plurality of computer programs, and
 the processor being configured to execute the plurality of computer programs in the memory to implement the method in the foregoing aspects.

According to another aspect, the embodiments of this application further provide a non-transitory computer-readable storage medium, the storage medium being configured to store a plurality of computer programs, the computer programs, when executed by a processor of an electronic device, causing the electronic device to perform the method in the foregoing aspects.

As can be seen from the foregoing technical solutions, the embodiments of this application have the following advantages.

The embodiments of this application provide a face liveness detection method, in which an initial face image and a face image set corresponding to N illumination directions may be obtained first, then N difference images are obtained according to the initial face image and the face image set, and next a normal map and an albedo map are generated according to the N difference images and the N illumination directions, and finally a face liveness detection result is determined according to the N difference images, the normal map, and the albedo map. Through the foregoing method, the normal map and the albedo map of the face image can be calculated by using incident light in different directions to illuminate a face. The normal map includes 3D geometric information of a to-be-recognized face, and the albedo map includes surface material information of the to-be-recognized face. In addition, the 3D geometric information and the surface material information of the face image are considered simultaneously, thereby recognizing the authenticity of the face image, and effectively resisting different face liveness attack manners.

DESCRIPTION OF EMBODIMENTS

Embodiments of this application provide a face liveness detection method and a related apparatus, a device, and a storage medium, so that a normal map and an albedo map of a face image can be calculated by using incident light in different directions to illuminate a face, and in addition, 3D geometric information and surface material information of the face image are considered simultaneously, thereby recognizing the authenticity of the face image, and effectively resisting different face liveness attack manners.

The terms such as "first", "second", "third", and "fourth" (if any) in the specification and claims of this application and in the accompanying drawings are used for distinguishing between similar objects and not necessarily used for describing any particular order or sequence. Data used in this way may be interchanged in an appropriate case, so that the embodiments of this application described herein can be implemented in a sequence other than the sequence illustrated or described herein. In addition, the terms "include", "corresponding to" and any other variants are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device.

It is to be understood that the face liveness detection method provided in this application can be applied to face recognition scenarios, and can be specifically applied to a quantity of different fields, such as security, finance, and attendance. During actual application, due to the ubiquitous presence of various interference factors such as posture changes, reflection of glasses, intensity of light, and expression changes, the effect of face recognition is easily affected, and problems of using 3D silicone faces, 3D print faces, and the like to attack face recognition also become increasingly severe. Face liveness detection is not only the basis of subsequent face recognition, but also has wide application values in the fields such as finance, security, and attendance.

Figure 1:
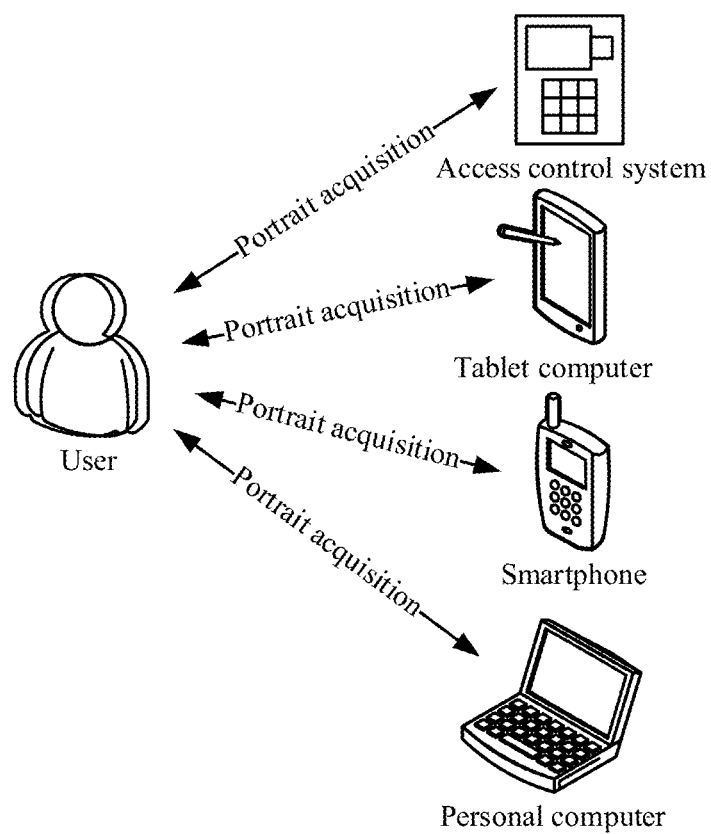
FIG. 1 is a schematic architectural diagram of a face liveness detection system according to an embodiment of this application.

The face liveness detection method provided in this application may be applied to an environment shown in FIG. 1. FIG. 1 is a schematic architectural diagram of a face liveness detection system according to an embodiment of this application. As shown in the figure, the method provided in this application may be applied to terminal devices such as tablet computers, smartphones, personal computers (PCs), or access control systems. For example, in the financial field, there is a need for face liveness detection. Users may perform operations that require identity verification such as transfers, payments, or modification of account information by using smartphones. Specifically, when a plurality of face images of a user A are acquired by using a smartphone, the smartphone can identify the identity of the user A by using the face liveness detection method provided in this application, so as to determine whether an operation is initiated by the user A. In another example, in the security field, customs clearance may be performed by using self-service customs clearance devices. Specifically, a user B performs customs clearance by using a self-service customs clearance device. The self-service customs clearance device may perform liveness detection on an acquired portrait of the user B by using the face liveness detection method provided in this application, to identify whether the identity is fraudulent. In another example, in the attendance field, the face liveness detection method may be applied to face recognition clocking in machines or face access control systems. Specifically, face liveness detection is performed on a user C when the user C clocks in or unlocks the access control, so as to prevent clocking in on behalf of others or identity theft by unrelated persons. Application scenarios are not exhaustively listed herein.

Figure 2:
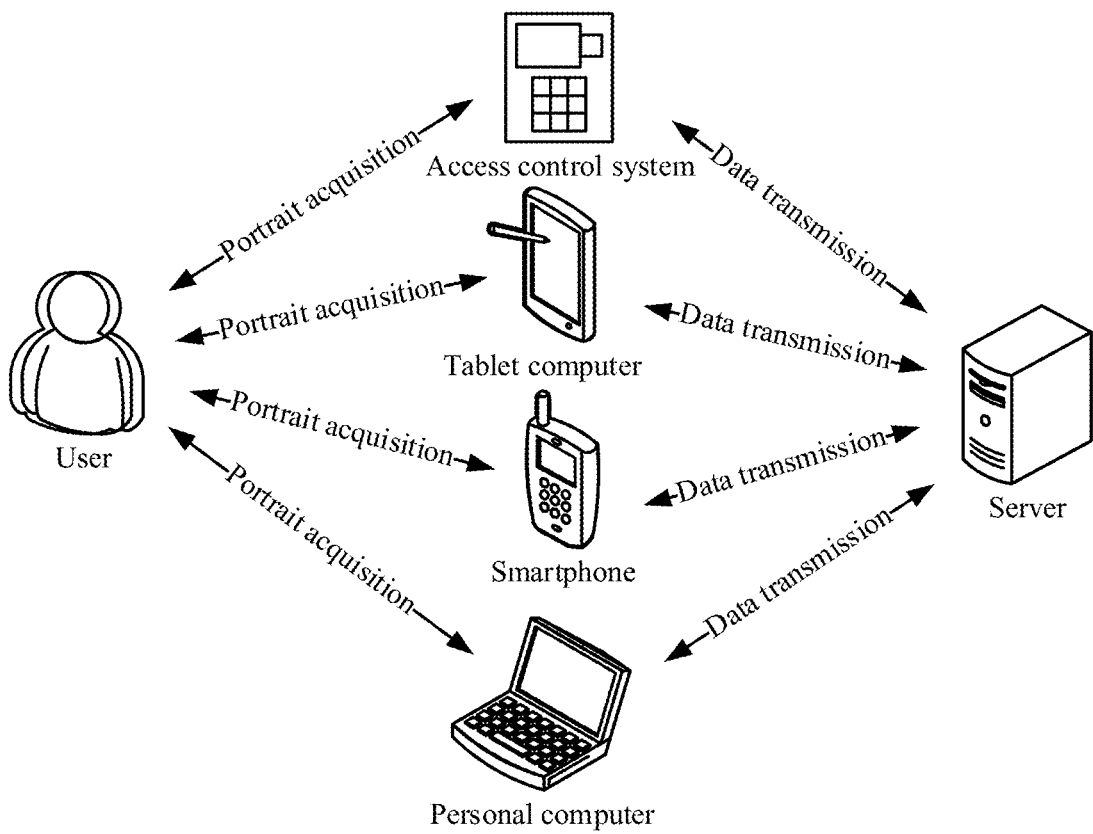
FIG. 2 is another schematic architectural diagram of a face liveness detection system according to an embodiment of this application.

To perform face liveness detection in the foregoing scenarios to recognize the authenticity of face images, this application provides a face liveness detection method, and the method can be applied to the system architecture in FIG. 2. FIG. 2 is another schematic architectural diagram of a face liveness detection system according to an embodiment of this application. As shown in the figure, the face liveness detection method provided by this application may be further applied to a server. For example, in the financial field, there is a need for face liveness detection. Supposing a user A transfers money by using a smartphone, when the smartphone acquires a plurality of face images of the user A, the smartphone may transmit the face images to a server. The server identifies the identity of the user A by using the face liveness detection method provided in this application, so as to determine whether the operation is initiated by the user A, and feeds a determining result back to a terminal device to complete face liveness detection. Application scenarios are not exhaustively listed herein.

During actual application, the selection of the system architecture may depend on factors such as the actual amount of to-be-processed data. For example, for an access control system, if the amount of user data stored by the access control system is relatively small, the method of this application may be deployed locally on an access control device. That is, when the access control device determines that a face liveness detection result is a live face, an acquired face may be compared with a face image stored locally on the access control device, so as to determine identity information. In another example, for an online bank payment system or a public security system, a large amount of user data usually needs to be stored. Therefore, the server may generate a face liveness detection result, and compare an acquired face with a face image stored locally on an access control device when determining that the face liveness detection result is a live face, so as to determine identity information.

The server in FIG. 2 is a server configured to perform face liveness detection, may be a server cluster including one or more servers or a cloud computing center, which is not specifically limited herein. The terminal device may be a tablet computer, a smartphone, a PC, or an access control device shown in FIG. 1 or FIG. 2, or may be a surveillance device, a face recognition device, or the like, which is not limited herein. In some implementations, a client configured with a face liveness detection apparatus may be represented as a web client, or may be represented as an application client, and is deployed on the foregoing terminal device.

The terminal device may communicate with the server by using a wireless network, a wired network, or a movable storage medium. The foregoing wireless network uses a standard communication technology and/or protocol. The wireless network is usually the Internet, but may alternatively be any other network, including but not limited to, a Bluetooth, a local area network (LAN), a metropolitan area network (MAN), a wide area network (WAN), or any combination of a mobile network, a dedicated network, or a virtual dedicated network. In some embodiments, custom or dedicated data communication technologies may be used in place of or in addition to the foregoing data communication technologies. The movable storage medium may be a universal serial bus (USB) flash drive, a removable hard disk, or another movable storage medium.

Although FIG. 2 only shows four terminal devices and one server, it is to be understood that, the example in FIG. 2 is only used for understanding this solution, and a specific quantity of the terminal devices and the servers is to be determined with reference to actual situations flexibly.

The embodiments of this application provide an AI-based face liveness detection method, in which the computer vision (CV) technology based on the field of AI may be used. Before describing the method provided in this application, some basic concepts in the field of AI are first described. AI is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology of computer science, which attempts to understand essence of intelligence and produces a new intelligent machine that can respond in a manner similar to human intelligence. AI is to study the design principles and implementation methods of various intelligent machines, to enable the machines to have the functions of perception, reasoning, and decision-making. AI technology is a comprehensive discipline, covering a wide range of fields including both a hardware-level technology and a software-level technology. Basic AI technologies generally include technologies such as sensors, dedicated AI chips, cloud computing, distributed storage, big data processing technologies, operating/interaction systems, and mechatronics. AI software technologies mainly include a computer vision technology, a speech processing technology, a natural language processing (NLP) technology, machine learning (ML)/deep learning, and the like.

The CV is a science that studies how to use a machine to "see", and furthermore, that uses a camera and a computer to replace human eyes to perform machine vision such as recognition, tracking, and measurement on an object, and further perform graphic processing, so that the computer processes the object into an image more suitable for human eyes to observe, or an image transmitted to an instrument for detection. As a scientific discipline, CV studies related theories and technologies and attempts to establish an AI system that can obtain information from images or multi-dimensional data. The CV technologies generally include technologies such as image processing, image recognition, image semantic understanding (ISU), image retrieval, optical character recognition (OCR), video processing, video semantic understanding, video content/behavior recognition, 3D object reconstruction, a 3D technology, virtual reality, augmented reality, synchronous positioning, and map construction, and further include biological feature recognition technologies such as common face recognition and fingerprint recognition.

With the research and progress of the AI technology, the AI technology is studied and applied to a plurality of fields, such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied in more fields, and play an increasingly important role.

Figure 3:
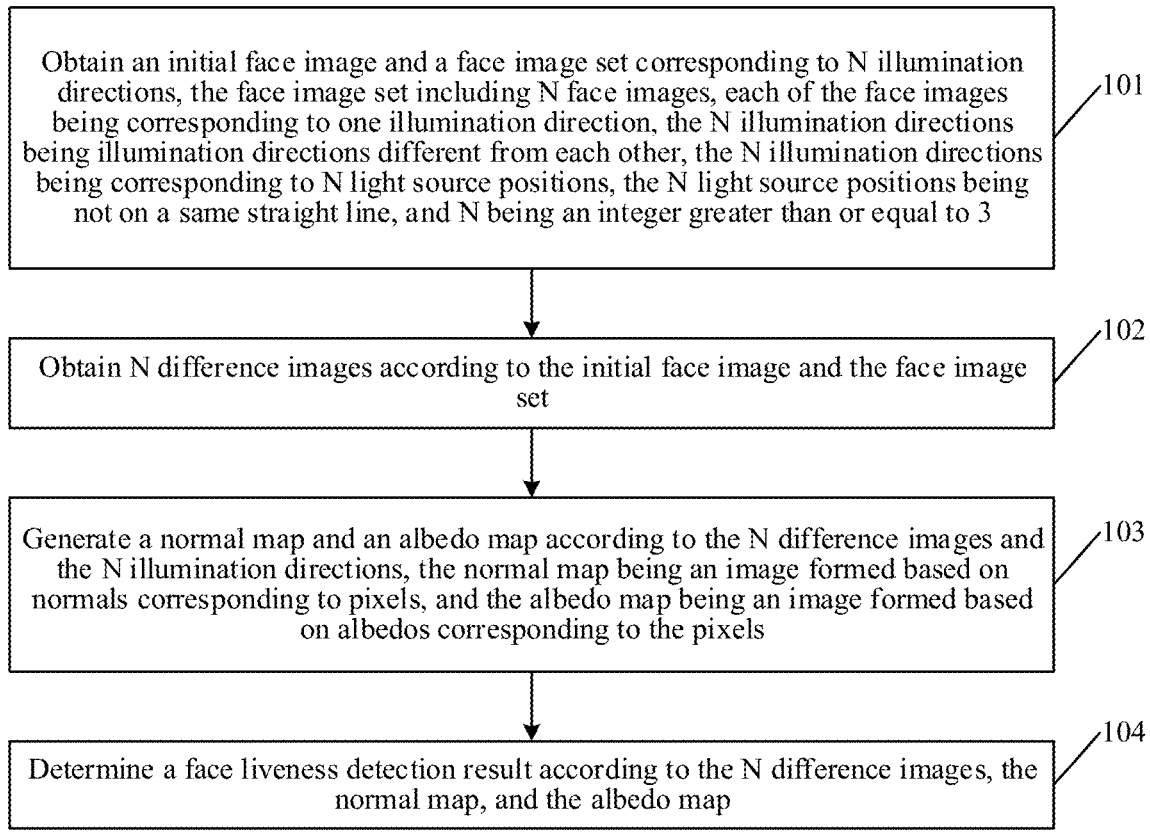
FIG. 3 is a schematic diagram of a face liveness detection method according to an embodiment of this application.

The face liveness detection method in this application is described below with reference to the foregoing description. Referring to FIG. 3, an embodiment of the face liveness detection method in the embodiments of this application includes the following steps:

101: Obtain an initial face image of an object and a face image set of the object, the face image set comprising N face images of the object captured according to N illumination directions, the N illumination directions corresponding to N light source positions, the N light source positions being not on a same straight line, and N being an integer greater than or equal to 3.

In this embodiment, a face liveness detection apparatus obtains the initial face image and the face image set corresponding to the N illumination directions. The initial face image is a face image captured in natural light, and expressions and positions of faces included in the N face images remain unchanged or are slightly changed. In weak natural light such as a dark environment, it is difficult for an image acquisition apparatus to capture a clear face image. In this case, the initial face image may be alternatively captured with a plurality of light sources or all light sources turned on simultaneously.

Figure 4:
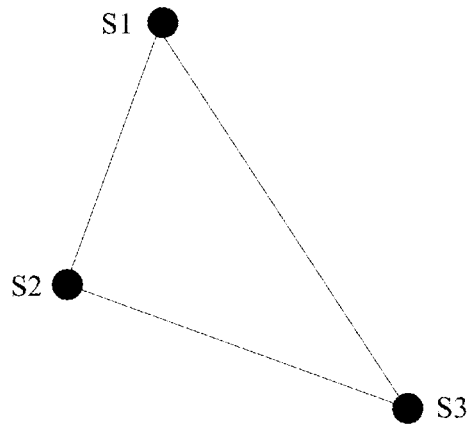
FIG. 4 is a schematic diagram of arrangement of light source positions according to an embodiment of this application.

The N light sources are not to be in the same straight line. For ease of understanding, refer to FIG. 4. FIG. 4 is a schematic diagram of arrangement of light source positions according to an embodiment of this application. As shown in the figure, when N is 3, positions of light sources may form a triangle as shown in FIG. 4 after connected two by two. It is to be understood that the quantity and positions of the light sources shown in FIG. 4 are only examples. In another embodiment, there may be more than three light sources, and the positions of the light sources may alternatively form another pattern. For example, positions corresponding to four light sources may form a rectangle, a parallelogram or another quadrilateral, and positions corresponding to five light sources may form a pentagon or another shape. This is not limited herein.

The face liveness detection apparatus may be deployed on a server or a terminal device. For ease of description, descriptions are made in this application by using an example in which the face liveness detection apparatus is deployed on a terminal device. However, this is not to be understood as a limitation on this application.

102: Obtain N difference images according to the initial face image and the N face images in the face image set.

In this embodiment, the face liveness detection apparatus may obtain the N difference images according to the initial face image and the face image set. Because the face images correspond to different illumination directions, the difference image may be understood as a difference image between a face image obtained under light conditions in a specific illumination direction and the initial face image obtained under natural light conditions. The difference image can be obtained by subtracting the initial face image from the face image. Specifically, the difference image can be obtained by subtracting pixel values of corresponding positions on the initial face image from pixel values on the face image.

103: Generate a normal map and an albedo map according to the N difference images and the N illumination directions, the normal map being an image formed based on normals corresponding to pixels, and the albedo map being an image formed based on albedos corresponding to the pixels.

In this embodiment, the face liveness detection apparatus generates the normal map and the albedo map according to the N difference images and the N illumination directions. The normal map is an image formed based on the normals corresponding to the pixels, and the albedo map is an image formed based on the albedos corresponding to the pixels. Different channels may be red green blue (RGB) channels, or YUV channels or HSV channels. This is not limited herein. The normal map includes 3D geometric information used for representing an uneven surface in the face image, and uses values in different channels to record normal directions of the pixels. The albedo map includes surface material information. Black and white may be used for indicating the reflection intensity level of the image. For example, a black pixel indicates that an albedo of a position is 0%, and a white pixel indicates that an albedo of a position is 100%.

104: Determine a face liveness detection result according to the N difference images, the normal map, and the albedo map. The face liveness detection result indicates whether the object has a live face or not.

In this embodiment, the face liveness detection apparatus determines the face liveness detection result according to the N difference images, the normal map, and the albedo map. The face liveness detection result may be expressed as a probability value, and the possibility that a detected face is a live face can be determined based on the probability value. In some embodiments, the face liveness detection result may be alternatively expressed as a determining result, for example, a detected face is a live face, or a detected face is a non-live face. If the face liveness detection result is non-live face, the terminal device may display alarm information, or notify relevant staff through short messaging service, email, or the like. For example, at the customs, if a face liveness detection result of a user A is non-live face, a customs clearance gate may be locked and the customs staff is notified for manual inspection. If a face liveness detection result of a user B is live face, subsequent operations may be performed. In another example, in face payment, if a face liveness detection result of the user B is live face, a subsequent operation such as verification or payment may be performed.

In this embodiment of this application, a face liveness detection method is provided. The initial face image and the face image set corresponding to the N illumination directions may be obtained first, then N difference images are obtained according to the initial face image and the face image set, and next, the normal map and the albedo map are generated according to the N difference images, and finally the face liveness detection result is determined according to the N difference images, the normal map, and the albedo map. Through the foregoing method, the normal map and the albedo map of the face image can be calculated by using incident light in different directions to illuminate a face. The normal map includes 3D geometric information, and the albedo map includes surface material information. In addition, the 3D geometric information and the surface material information of the face image are considered simultaneously, thereby recognizing the authenticity of the face image, and effectively resisting different face liveness attack manners.

In some embodiments, based on the embodiments corresponding to FIG. 3, in an embodiment of the face liveness detection method provided in the embodiments of this application, the face image set includes at least a first face image, a second face image, and a third face image. The obtaining an initial face image and a face image set corresponding to N illumination directions in step 101 may include the following steps:

obtaining the initial face image;

obtaining the first face image at a first moment that is within a target duration;

obtaining the second face image at a second moment that is within the target duration, the second moment and the first moment being different moments; and obtaining the third face image at a third moment that is within the target duration, the third moment and the first moment being different moments, and the third moment and the second moment being different moments.

In this embodiment, a method for obtaining the initial face image and the N face images within the target duration is described. The face liveness detection apparatus may obtain the face image set within the target duration. Each illumination direction is generally fixed. Therefore, when the face posture is unchanged, for a specific part of the face, a light incident angle of each illumination direction is fixed. If relative positions of the face and the light source in each face image changes, an incident angle at the same position changes. For example, in the first illumination direction and the second illumination direction, incident angles at a position of the nose tip are $\lambda 1$ and $\lambda 2$ respectively. If the position of the nose tip changes in a face image corresponding to the second illumination direction, an actual value of the incident angle may change to $\lambda 3$. During calculation of the normal map and the albedo map, the face image needs to be aligned with the initial face image as much as possible, and values of the incident angles used in the calculation still are $\lambda 1$ and $\lambda 2$. As a result, if a difference between $\lambda 2$ and $\lambda 3$ is relatively large, the accuracy of a calculation result will be affected, and a specific error will be generated, causing a decrease in the accuracy of the normal map and the albedo map obtained through calculation based on the difference images. In a process of acquiring a face image, it needs to be ensured that the face posture and facial muscles remain unchanged as much as possible. Rotating or moving the head may cause a posture change.

To ensure that the face posture and facial muscles in the initial face image and the N face images are as consistent as possible, the face image needs to be obtained within the target duration. The target duration may be a preset fixed duration, such as 1 second, or may be dynamically adjusted manually. For example, when a surrounding environment is relatively large, the target duration may be extended, so that the face image has a longer exposure time to improve the clarity of the image. In a surrounding environment with good lighting, the target duration may be shortened to reduce the possibility that image acquisition fails due to changes of face postures, shaking of facial muscles, or shaking of the image acquisition apparatus when a user obtains images.

Figure 5:
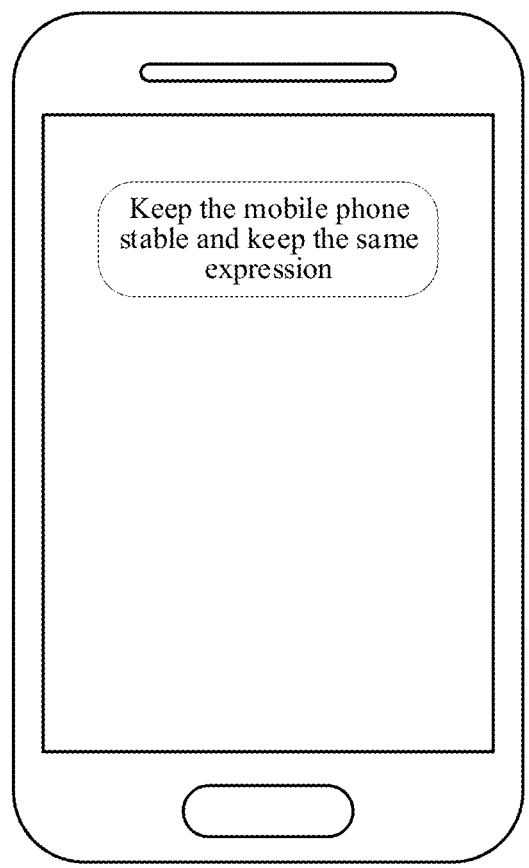
FIG. 5 is a schematic diagram of an interface of displaying a prompt message for image acquisition by a terminal device according to an embodiment of this application.

It is understandable that if the acquisition of the face image fails, or a related prompt may be further displayed before the face image is acquired, for ease of understanding, refer to FIG. 5. FIG. 5 is a schematic diagram of an interface of displaying a prompt message for image acquisition by a terminal device according to an embodiment of this application. As shown in the figure, during face payment of a user by using a mobile phone, a text prompt (or a voice prompt) of "Keep the mobile phone stable and keep the same expression" may be displayed on the screen before a face image is captured and acquired, to prompt the user to cooperate for the operation. For the above purpose, the face liveness detection apparatus may further detect whether the terminal device shakes during the process of obtaining the face image. For example, based on a gyroscope and/or a gravity sensor of the terminal device, it can be determined whether the terminal device shakes within the target duration. If shaking occurs, the operation of obtaining the face image can be stopped and face image acquisition is performed again In this embodiment of this application, a method for obtaining the initial face image and the N face images within the target duration is provided. Through the method, a plurality of face images are continuously acquired in a short time, so that positions and expressions of the face in the face images remain unchanged or are similar, which is conducive to calculating a difference image and improving the accuracy of face liveness detection.

In some embodiments, based on the embodiments corresponding to FIG. 3, in an embodiment of the face liveness detection method provided in the embodiments of this application, the face image set includes at least a first face image, a second face image, and a third face image. The N illumination directions include at least a first illumination direction, a second illumination direction, and a third illumination direction, the first illumination direction, the second illumination direction, and the third illumination direction being different from each other.

The obtaining an initial face image and a face image set corresponding to N illumination directions in step 101 may include the following steps:
  obtaining the initial face image;
  obtaining the first face image in the first illumination direction;
  obtaining the second face image in the second illumination direction; and
  obtaining the third face image in the third illumination direction.

In this embodiment, a method for obtaining the face images in different directions is described. The face liveness detection apparatus captures the initial face image and the face images in the illumination directions by using an image acquisition apparatus. The image acquisition apparatus may be a built-in camera or an external camera of the terminal device. It is to be understood that the face is illuminated by light sources from different directions, so that the face images under different illuminations are obtained. There is a correspondence between the illumination directions and the face images. That is, the first face image is obtained in the first illumination direction, the second face image is obtained in the second illumination direction, and the third face image is obtained in the third illumination direction, the first illumination direction, the second illumination direction, and the third illumination direction being different from each other.

For ease of understanding, a description is made below with an example. When a user A modifies bank account information by using a mobile phone, face liveness verification is required. First, an initial face image may be captured under natural light conditions through a built-in camera of the mobile phone. The screen of the mobile phone is then lit up to provide different illumination directions, and the built-in camera captures a corresponding face image A, face image B, and face image C in sequence. In the process of obtaining the face image, the mobile phone may display prompt information to guide the user to keep the mobile phone as stable as possible, and keep the face posture and facial muscles unchanged. After the initial face image, the face image A, the face image B, and the face image C are obtained, the mobile phone may calculate a difference image A, a difference image B, and a difference image C, then obtain a normal map and an albedo map, and finally generate a face liveness detection result by using the difference image A, the difference image B, and the difference image C, as well as the normal map and the albedo map. The mobile phone performs a subsequent operation according to the result, that is, allows the modification from the user A or displays alarm information.

To ensure that positions and expressions of a face in the face images are as consistent as possible, the image acquisition apparatus may capture the face images at different moments within a target duration in the foregoing method. The specific method is the same as the foregoing, and details are not repeated herein.

It is to be understood that, although the face liveness detection apparatus is used as an example in this embodiment, the foregoing process may be alternatively performed by the server and the face liveness detection apparatus interactively. For example, the face liveness detection apparatus may also upload the obtained face images and related information to the server, and the server calculates the face liveness detection result and returns the face liveness detection result to the mobile phone.

It is to be understood that the illumination directions and the quantity of corresponding face images in this embodiment are merely examples and are not to be understood as a limitation on this application. In other embodiments, more illumination directions may be provided and more corresponding face images may be captured according to actual situations.

In this embodiment of this application, a method for obtaining the face images in different directions is provided. Through the method, the initial face image and the face images in at least three illumination directions are obtained by using the image acquisition apparatus, thereby providing a reasonable data basis for calculations of the normal map and the albedo map, avoiding a calculation failure, and improving the reliability of calculation.

In some embodiments, based on the embodiments corresponding to FIG. 3, in an embodiment of the face liveness detection method provided in the embodiments of this application, the N light source positions include at least a first light source position, a second light source position, and a third light source position. The first light source position, the second light source position, and the third light source position are not on the same straight line.

The obtaining the first face image in the first illumination direction may include:

acquiring the first face image in the first illumination direction when a first screen region of a terminal device is lit up, the first screen region being at the first light source position, and the first illumination direction being a corresponding direction when the first screen region is lit up to illuminate a to-be-recognized face.

The obtaining the second face image in the second illumination direction may include:

acquiring the second face image in the second illumination direction when a second screen region of the terminal device is lit up, the second screen region being at the second light source position, and the second illumination direction being a corresponding direction when the second screen region is lit up to illuminate the to-be-recognized face.

The obtaining the third face image in the third illumination direction may include:

acquiring the third face image in the third illumination direction when a third screen region of the terminal device is lit up, the third screen region being at the third light source position, and the third illumination direction being a corresponding direction when the third screen region is lit up to illuminate the to-be-recognized face.

In this embodiment, a method for obtaining the face image based on a mode in which the screen region of the face liveness detection apparatus is lit up is described. The terminal device lights up the first screen region to illuminate the to-be-recognized face. A position of the first screen region is the first light source position, and a direction in which the face is illuminated by a light source at the first light source position is the first illumination direction. After the image acquisition apparatus photographs the face to obtain the first face image, the terminal device turns off the first screen region. Similarly, the terminal device lights up the second screen region to illuminate the to-be-recognized face. A position of the second screen region is the second light source position, and a direction in which the face is illuminated by light at the second light source position is the second illumination direction. After the image acquisition apparatus photographs the face to obtain the second face image, the terminal device turns off the second screen region. The terminal device lights up the third screen region to illuminate the to-be-recognized face. A position of the third screen region is the third light source position, and a direction in which the face is illuminated by light at the third light source position is the third illumination direction. After the image acquisition apparatus photographs the face to obtain the third face image, the terminal device turns off the third screen region. Similarly, in other embodiments, there are more screen regions, and corresponding face images are obtained by using a method similar to the foregoing method. This is not exhaustively listed herein.

Figure 6:
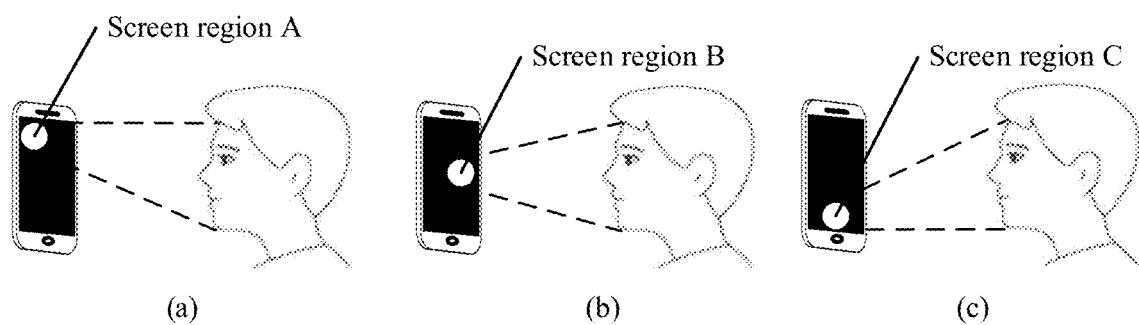
FIG. 6 is a schematic diagram of a method for acquiring a face image set according to an embodiment of this application.

For ease of understanding, refer to FIG. 6. FIG. 6 is a schematic diagram of a method for acquiring a face image set according to an embodiment of this application. A terminal device is used as an example of the face liveness detection apparatus. Supposing the terminal device is a mobile phone, specifically, as shown in (a) in FIG. 6, when the face image set is acquired by using the mobile phone, the mobile phone lights up a screen region A, and the screen region A after lit up is used for providing a light source from a first illumination direction, so that the mobile phone captures a first face image of a user A in the first illumination direction, and then turns off the screen region A. Similarly, as shown in (b) in FIG. 6, the mobile phone lights up a screen region B, and the screen region B after lit up is used for providing a light source from a second illumination direction, so that the mobile phone captures a second face image of the user A in the second illumination direction, and then turns off the screen region B. Finally, as shown in (c) in FIG. 6, the mobile phone lights up a screen region C, and the screen region C after lit up is used for providing a light source from a third illumination direction, so that the mobile phone captures a third face image of the user A in the third illumination direction, and then turns off the screen region C.

Figure 7:
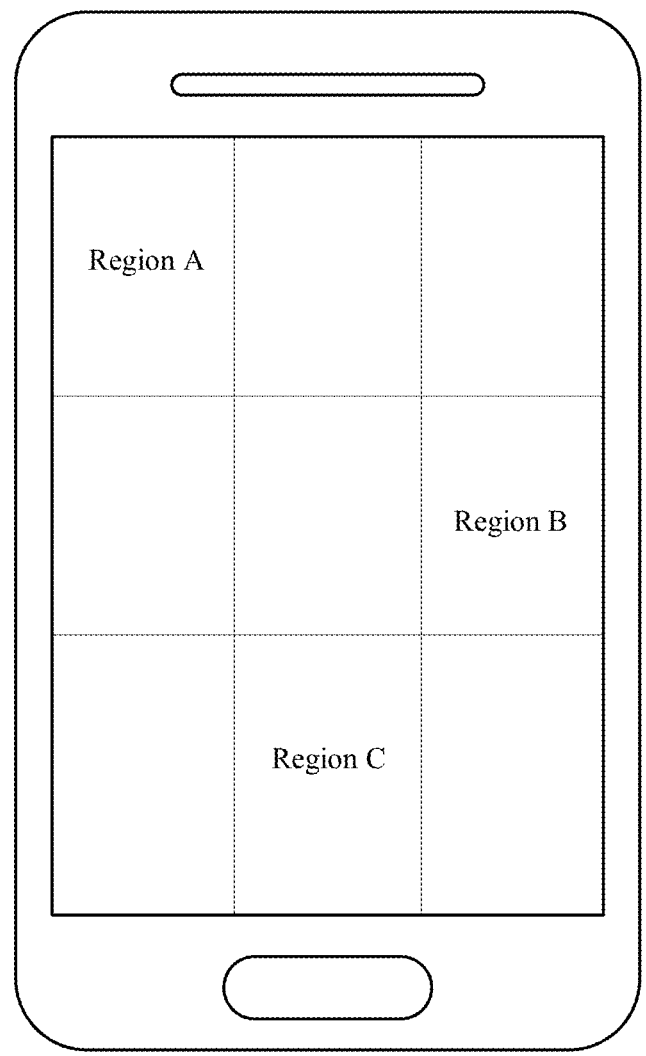
FIG. 7 is a schematic diagram of screen regions according to an embodiment of this application.

For ease of understanding, the screen of the terminal device may be divided into a plurality of regions, and the regions are used for providing light sources from different illumination directions. FIG. 7 is a schematic diagram of screen regions according to an embodiment of this application. As shown in the figure, a screen is divided into 9 regions. Suppose a region A is a first screen region, a region B is a second screen region, and a region C is a third screen region. When the mobile phone lights up the region A, the screen of the region A may be set to a screen-on state, and regions other than the region A are in a screen-off state. Unused regions in FIG. 7 may be candidate regions, which may be lit up for use when more regions are required as light sources. It is to be understood that the division manner in FIG. 7 is merely an example. In actual application, regions may be divided into any shapes such as circles in any manner. The quantity of regions and a lighting sequence may also be determined according to actual requirements. This is not limited herein.

It can be understood that light emitted in a screen-on state includes but is not limited to white light, red light, purple light, or the like. This is not limited herein. In addition, the screen that is lit up may also simulate natural light.

In the process of obtaining the face image set, only a light source corresponding to one light source position is lit up each time, and light sources corresponding to a plurality of light source positions are not lit up simultaneously.

In this embodiment of this application, a method for obtaining the face images based on a mode in which the screen regions of the terminal device are lit up. Through the method, the screen is divided into a plurality of regions and the face image set is obtained by using the regions as light sources, thereby obtaining illuminations in different illumination directions without additional light sources by using the screen, improving the convenience of obtaining the images, saving hardware costs, and making the size of the terminal device smaller.

In some embodiments, based on the embodiments corresponding to FIG. 3, in an embodiment of the face liveness detection method provided in the embodiments of this application, the N light source positions include at least a first light source position, a second light source position, and a third light source position. The first light source position, the second light source position, and the third light source position are not on the same straight line.

The obtaining the first face image in the first illumination direction may include:

acquiring the first face image in the first illumination direction when a first light-emitting region is lit up, the first light-emitting region being at the first light source position, and the first illumination direction being a corresponding direction when the first light-emitting region is lit up to illuminate a to-be-recognized face;

The obtaining the second face image in the second illumination direction may include:

acquiring the second face image in the second illumination direction when a second light-emitting region is lit up, the second light-emitting region being at the second light source position, and the second illumination direction being a corresponding direction when the second light-emitting region is lit up to illuminate the to-be-recognized face.

The obtaining the third face image in the third illumination direction may include:

acquiring the third face image in the third illumination direction when a third light-emitting region is lit up, the third light-emitting region being at the third light source position, and the third illumination direction being a corresponding direction when the third light-emitting region is lit up to illuminate the to-be-recognized face.

In this embodiment, a method for obtaining the face image based on a mode in which the light-emitting region is lit up is described. The light-emitting region may be provided with a light-emitting diode (LED), a compact fluorescent lamp or another lighting device. In this embodiment, using an LED as an example, the face liveness detection apparatus lights up a first LED to illuminate the to-be-recognized face. A position of the first LED is the first light source position. A direction in which the first LED illuminates the face is the first illumination direction. The image acquisition apparatus photographs the face to obtain the first face image, and the face liveness detection apparatus then turns off the first LED. Similarly, the face liveness detection apparatus lights up a second LED to illuminate the to-be-recognized face. A position of the second LED is the second light source position. A direction in which the second LED illuminates the face is the second illumination direction. The image acquisition apparatus photographs the face to obtain the second face image, and the face liveness detection apparatus then turns off the second LED. The face liveness detection apparatus lights up a third LED to illuminate the to-be-recognized face. A position of the third LED is the third light source position. A direction in which the third LED illuminates the face is the third illumination direction. The image acquisition apparatus photographs the face to obtain the third face image, and the face liveness detection apparatus then turns off the third LED. In other embodiments, there are another quantity of LEDs (at least three), and corresponding face images are obtained by using a method similar to the foregoing method. This is not exhaustively listed herein.

Figure 8:
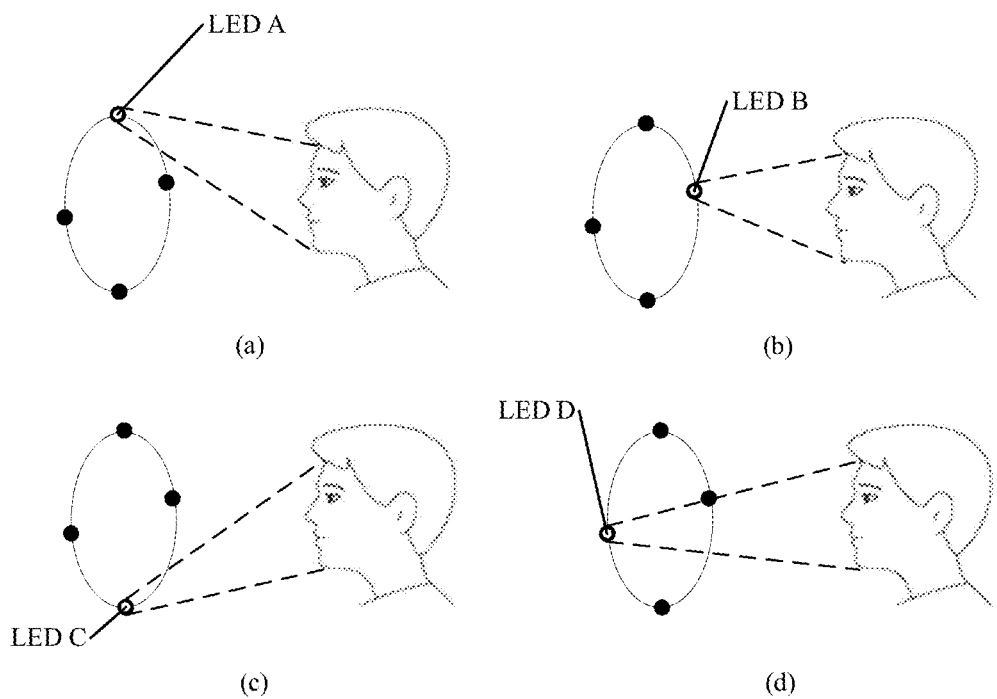
FIG. 8 is a schematic diagram of a method for acquiring a face image set according to an embodiment of this application.

For ease of understanding, refer to FIG. 8. FIG. 8 is a schematic diagram of a method for acquiring a face image set according to an embodiment of this application. A terminal device is used as an example of the face liveness detection apparatus, and the terminal device can control an LED on or off. Specifically, as shown in (a) in FIG. 8, when the face image set is acquired, the terminal device first controls an LED A on, and the LED A after lit up is configured to provide a light source from a first illumination direction, so that a mobile phone captures a first face image of a user A in the first illumination direction, and the terminal device then controls the LED A off. Similarly, as shown in (b) in FIG. 8, the terminal device controls an LED B on, and the LED B after lit up is configured to provide a light source from a second illumination direction, so that the mobile phone captures a second face image of the user A in the second illumination direction, and the terminal device then controls the LED B off. As shown in (c) in FIG. 8, the terminal device controls an LED C on, and the LED C after lit up is configured to provide a light source from a third illumination direction, so that the mobile phone captures a third face image of the user A in the third illumination direction, and the terminal device then controls the LED C off. In addition, more face images may be further captured. As shown in (d) in FIG. 8, the terminal device controls an LED D on, and the LED D after lit up is configured to provide a light source from a fourth illumination direction, so that the mobile phone captures a fourth face image of the user A in a fourth illumination direction, and the terminal device then controls the LED D off.

Figure 9:
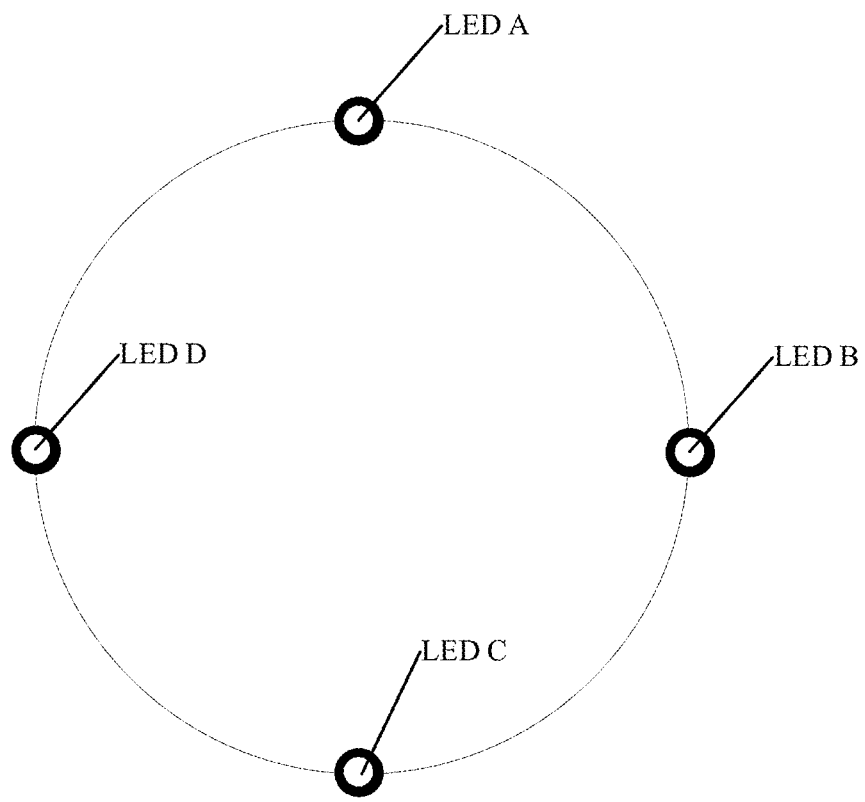
FIG. 9 is a schematic diagram of a light-emitting diode (LED) arrangement manner according to an embodiment of this application.

Light sources may include a plurality of LEDs, and the LEDs are configured to provide different illumination directions. For ease of understanding, refer to FIG. 9. FIG. 9 is a schematic diagram of an LED arrangement manner according to an embodiment of this application. As shown in the figure, LEDs may be distributed on a circular circumference. It is to be understood that the distribution manner of the LEDs in FIG. 9 is merely an illustration. In actual application, the LEDs may be distributed in any shape, such as a rectangle or an ellipse. The quantity and lighting sequence of the LEDs may also be determined according to actual requirements. This is not limited herein.

It can be understood that light emitted by the light source in a lighted state includes but is not limited to white light, red light, purple light, or the like. This is not limited herein. In addition, the LED that is lit up may also simulate natural light.

In the process of obtaining the face image set, only a light source corresponding to one light source position is lit up each time, and light sources corresponding to a plurality of light source positions are not lit up simultaneously.

In this embodiment of this application, a method for obtaining the face images based on an LED lighting mode is described. Through the method, the LEDs are used as light sources for obtaining the face image set, thereby providing better illumination effect, and improving the degree of difference between the face image and the initial face image and the clarity of a face graphics, which is conducive to improving the accuracy of calculation.

In some embodiments, based on the embodiments corresponding to FIG. 3, in an embodiment of the face liveness detection method provided in the embodiments of this application, the face image set includes at least a first face image, a second face image, and a third face image.

The obtaining N difference images according to the initial face image and the face image set may include:

performing face key point detection on the initial face image to obtain an initial face key point set, the initial face key point set including a plurality of initial face key points;

performing face key point detection on the first face image to obtain a first face key point set, the first face key point set including a plurality of first face key points;

performing face key point detection on the second face image to obtain a second face key point set, the second face key point set including a plurality of second face key points;

performing face key point detection on the third face image to obtain a third face key point set, the third face key point set including a plurality of third face key points;

generating a first difference image according to the initial face key point set and the first face key point set, the first difference image being one of the N difference images;

generating a second difference image according to the initial face key point set and the second face key point set, the second difference image being a difference image different from the first difference image in the N difference images; and generating a third difference image according to the initial face key point set and the third face key point set, the third difference image being a difference image different from the first difference image and the second difference image in the N difference images.

In this embodiment, a method for generating the difference images based on the face key points is described. The face liveness detection apparatus performs face key point detection on the initial face image to obtain the initial face key point set including the plurality of initial face key points. Similarly, face key point detection further needs to be performed on the first face image to obtain the first face key point set including the plurality of first face key points. Face key point detection is performed on the second face image to obtain the second face key point set including the plurality of second face key points. Face key point detection is performed on the third face image to obtain the third face key point set including the plurality of third face key points. The key points are used for identifying features of the face, such as eyes, nose tip, mouth corner points, eyebrows, or contour points of various parts of the face. Features identified in the initial face key point set, the first face key point set, the second face key point set, and the third face key point set are the same. The face liveness detection apparatus generates the first difference image according to the initial face key point set and the first face key point set. Similarly, the second difference image is generated according to the initial face key point set and the second face key point set. Similarly, the third difference image is generated according to the initial face key point set and the third face key point set. In one embodiment, in the process of generating the first difference image, the face liveness detection apparatus first performs face alignment on the first face image and the initial face image according to the first face key point set and the initial face key point set, and then generates the first difference image based on the aligned images. The second difference image and the third difference image are generated in a similar way as the first difference image, and details are not be described herein again.

Figure 10:
FIG. 10 is a schematic diagram of face key point sets according to an embodiment of this application.
Figure 10:
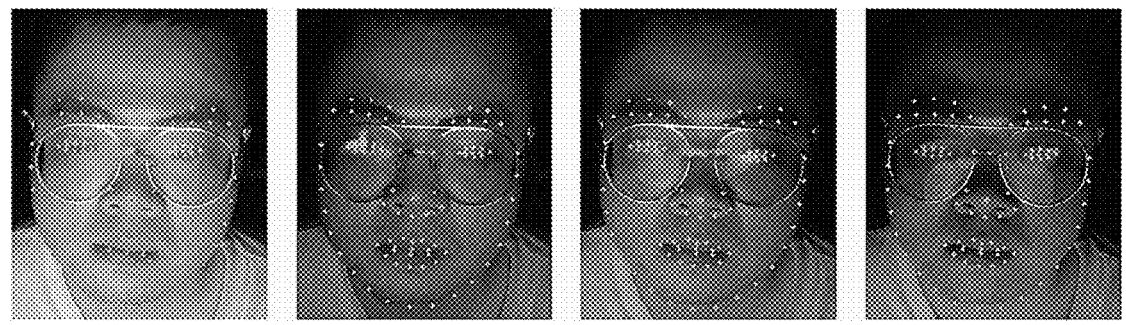

For ease of description, refer to FIG. 10. FIG. 10 is a schematic diagram of face key point sets according to an embodiment of this application. As shown in the figure, FIG. 10 includes an initial face image P0, a first face image P1, a second face image P2, and a third face image P3. The face liveness detection apparatus performs face key point detection on the initial face image P0 to obtain a face key point set S0, and marks face key points in the face key point set S0 to corresponding positions on the initial face image P0, so that the initial face image P0 marked with the key points in FIG. 10 can be obtained. Similarly, the face liveness detection apparatus performs face key point detection on the face image P1, the face image P2, and the face image P3 in FIG. 10, and obtains the face key point set S1 of the face image P1, the face key point set S2 of the face image P2, and the face key point set S3 of the face image P3.

After the face key point set S0 on the initial face image P0 is aligned with the face key point set S1 on the face image P1, a corresponding difference image D1 may be generated. After the face key point set S0 on the initial face image P0 is aligned with the face key point set S2 on the face image P2, a corresponding difference image D2 may be generated. After the face key point set S0 on the initial face image P0 is aligned with the face key point set S3 on the face image P3, a corresponding difference image D3 may be generated. An alignment manner includes but is not limited to translation, rotation, or scaling.

It is to be understood that there is no sequence requirement for key point detection of the plurality of face images, and there is no sequence requirement for generating the difference images. For example, face key point detection may be first performed on the first face image. After the first key point set is obtained, the first difference image is generated, and face key point detection is then performed on the second face image. Alternatively, key point detection may be first performed on the first face image and the second face image, and corresponding difference images are then generated respectively. Alternatively, face key point detection may be simultaneously performed on the first face image and the second face image.

In this embodiment of this application, a method for generating the difference images based the face key points is provided. The method provides a specific basis for implementation of the solution, thereby helping improve the feasibility of the solution.

In some embodiments, based on the foregoing embodiments corresponding to FIG. 3, in an embodiment of the face liveness detection method provided in this embodiment of this application, the method may further include:

calculating a first key point offset according to the initial face key point set and the first face key point set;

calculating a second key point offset according to the initial face key point set and the second face key point set;

calculating a third key point offset according to the initial face key point set and the third face key point set;

displaying a prompt message for re-acquisition when at least one of the first key point offset, the second key point offset, or the third key point offset is greater than or equal to an offset threshold; and performing, when the first key point offset, the second key point offset, and the third key point offset are all less than the offset threshold, the operations of generating a first difference image according to the initial face key point set and the first face key point set, generating a second difference image according to the initial face key point set and the second face key point set, and generating a third difference image according to the initial face key point set and the third face key point set.

In this embodiment, a method for determining, based on the offsets of the face key point sets, whether image acquisition succeeds is described. The face liveness detection apparatus respectively calculates the first key point offset, the second key point offset, and the third key point offset based on the initial face key point set, the first face key point set, the second face key point set, and the third face key point set. In a case that at least one of the first key point offset, the second key point offset, or the third key point offset is greater than or equal to an offset threshold, it indicates that differences of positions and expressions between acquired face images are relatively large, which further affects the accuracy of a face liveness detection result. As a result, a prompt message for re-acquisition needs to be displayed for a user to prompt the user to re-acquire a face image. If the first key point offset, the second key point offset, and the third key point offset are all less than the offset threshold, it indicates that a relatively accurate face liveness detection result can be calculated based on the acquired face images. Therefore, the face liveness detection apparatus may further generate the corresponding difference images based on the acquired face images.

Manners for determining the key point offset are described below, which may include the following three manners:

In the first manner, an offset of any pair of corresponding key points in the key point set may be obtained. Supposing the initial face key point is a nose tip key point, and the first face key point is also a nose tip key point, during calculation of the first key point offset, a minimum distance between the pixels of the initial face key point and the first face key point may be calculated. The minimum distance is the first key point offset.

The second key point offset and the third key point offset are calculated in a similar manner, which are not be listed one by one herein.

In the second manner, a maximum offset in the key point sets may be obtained as the key point offset. Supposing there are 100 initial face key points and 100 first face key points, 100 key point distances are calculated based on the initial face key points and the corresponding first face key points, and a maximum value is then selected from the key point distances as the first key point offset.

The second key point offset and the third key point offset are calculated in a similar manner, which are not be listed one by one herein.

In the third manner, an average value of offsets of the key points in the key point sets may be obtained as the key point offset. Supposing there are 100 initial face key points and 100 first face key points, 100 key point distances are calculated based on the initial face key points and the corresponding first face key points. An average value of the 100 key point distances is then calculated to obtain a key point average distance, and the key point average distance is used as the first key point offset.

The second key point offset and the third key point offset are calculated in a similar manner, which are not be listed one by one herein.

The method of determining a value of the offset threshold is described below. The offset threshold may be a fixed threshold or a dynamic threshold. The fixed threshold may have a plurality of alternative thresholds. The face liveness detection apparatus determines an actual value of the fixed threshold according to an actual situation. For example, the alternative thresholds may include an alternative threshold suitable for mobile phones, an alternative threshold suitable for tablet computers, and an alternative threshold suitable for self-service teller machines. When the face liveness detection apparatus is a mobile phone, the alternative threshold suitable for mobile phones may be used as the fixed threshold.

The dynamic threshold may be calculated based on the quantity of acquired face images and a preset threshold. A formula for calculating the dynamic threshold is as follows:

$$T = \alpha \frac{N}{S} \times P$$

where T represents the dynamic threshold, N represents the quantity of face images acquired by the face liveness detection apparatus, and S represents the default quantity of face images. Generally, S may be set to 3, P represents a default offset threshold, and α is a scaling factor.

Figure 11:
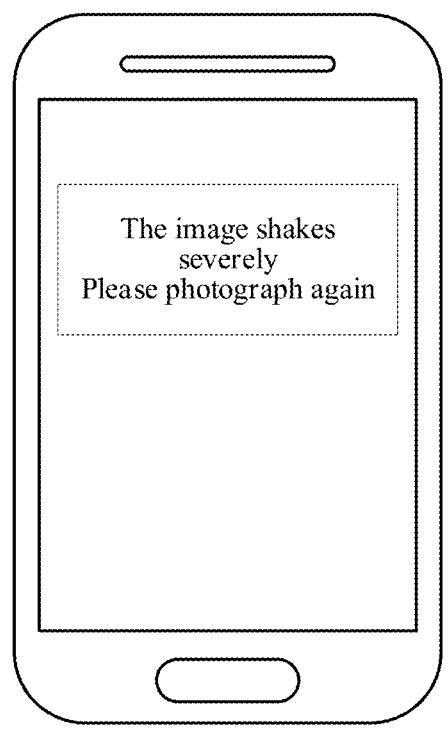
FIG. 11 is a schematic diagram of an interface of displaying a prompt message for re-acquisition by a terminal device according to an embodiment of this application.

For ease of understanding, refer to FIG. 11. FIG. 11 is a schematic diagram of an interface of displaying a prompt message for re-acquisition by a face liveness detection apparatus according to an embodiment of this application. As shown in the figure, suppose a fixed threshold M is adopted by the face liveness detection apparatus, and M=10. If a key point distance between a nose tip key point in the initial face key point set and a nose tip key point in the first face key point set is D, and D=30, because D>M, as shown in FIG. 11, the face liveness detection apparatus prompts a user with a prompt message "The image shakes severely, please photograph again" through the screen of the terminal device.

In this embodiment of this application, a method for determining, based on the offsets of the face key point sets, whether image acquisition succeeds is provided. Through the method, re-acquisition may be performed when difference between the acquired face images is excessively large, thereby avoiding a case that the face liveness detection result is affected due to the difference between the acquired images, and obtaining a more reliable face liveness detection result.

In some embodiments, based on the foregoing embodiments corresponding to FIG. 3, in an embodiment of the face liveness detection method provided in this embodiment of this application, the generating a first difference image according to the initial face key point set and the first face key point set may include:

determining a first transformation matrix according to the initial face key point set and the first face key point set;
aligning the first face image based on the first transformation matrix and the initial face image to obtain the aligned first face image; and
generating the first difference image according to the aligned first face image and the initial face image.

The generating a second difference image according to the initial face key point set and the second face key point set may include:

determining a second transformation matrix according to the initial face key point set and the second face key point set;
aligning the second face image based on the second transformation matrix and the initial face image to obtain the aligned second face image; and
generating the second difference image according to the aligned second face image and the initial face image.

The generating a third difference image according to the initial face key point set and the third face key point set may include:

determining a third transformation matrix according to the initial face key point set and the third face key point set;
aligning the third face image based on the third transformation matrix and the initial face image to obtain the aligned third face image; and
generating the third difference image according to the aligned third face image and the initial face image.

In this embodiment, a method for generating the difference images based on the transformation matrices is described. For the initial face key point set, the first face key point set, the second face key point set, and the third face key point set, the face liveness detection apparatus respectively determines the corresponding first transformation matrix, the second transformation matrix, and the third transformation matrix, and aligns the corresponding face images with the initial face image based on the obtained first transformation matrix, the second transformation matrix, and the third transformation matrix, and then generates the difference images based on the aligned face images and the initial face image.

A calculation formula of the transformation matrix is as follows:

$$M_i = \min\|K_0 - M_i \times K_i\|_{L2}$$

where $K_0$ represents the initial face key point set, $K_i$ represents a face key point set corresponding to the $i^{th}$ face image, which may be expressed as a 3×T matrix, and T is the quantity of key points, $M_i$ represents a transformation matrix from the $i^{th}$ face image to the initial face image, which can be expressed as a 2×3 matrix, and $\|\ \|_{L2}$ represents a norm of L2.

For ease of description, the generation of the first difference image is used as an example for description. It is understandable that other difference images are generated in a similar manner, and details are not described herein again. Supposing the first difference image has 100 first face key points, and the initial face image also has 100 corresponding initial face key points, if six first face key points are selected from the first face key points, and six initial face key points corresponding to the six first face key points are selected from the initial face key points, the first transformation matrix is calculated based on the six pairs of face key points. Next, the remaining 94 first face key points in the first face image are aligned with the remaining 94 initial face key points in the initial face image based on the calculated first transformation matrix to obtain the aligned first face image. Finally, the initial face image is subtracted from the aligned first face image to generate the first difference image. Alignment operations include, but are not limited to, affine transformations specifically including expansion, rotation, and translation.

In this embodiment of this application, a method for generating the difference images based on the transformation matrices is provided. Through the method, some key points in the face image and the initial face image may be used for generating the transformation matrix, and the transformation matrix is then used for aligning other key points on the face image and the initial face image to achieve image alignment.

In some embodiments, based on the foregoing embodiments corresponding to FIG. 3, in an embodiment of the face liveness detection method provided in this embodiment of this application, the generating a normal map and an albedo map according to the N difference images may include:

calculating normals and albedos according to the first difference image, the second difference image, and the third difference image;
generating the normal map according to the normals; and
generating the albedo map according to the albedos.

Figure 12:
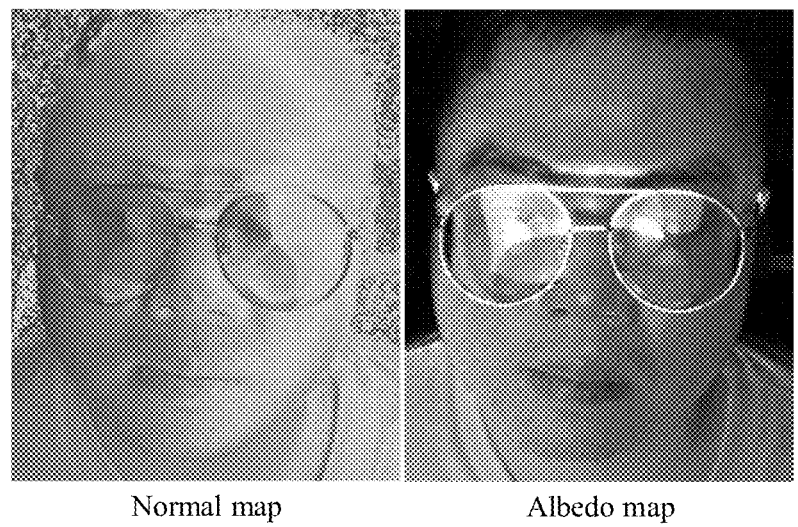
FIG. 12 is a schematic diagram of a normal map and an albedo map according to an embodiment of this application.

In this embodiment, a method of generating the normal map and the albedo map according to the N difference images is described. The face liveness detection apparatus may calculate normals of pixels on the normal map and albedos of pixels on the albedo map by solving simultaneous equations according to pixel values of the first difference image, pixel values of the second difference image, and pixel values of the third difference image, and generate the normal map based on the obtained normals of the pixels and generate the albedo map based on the obtained albedos of the pixels. For ease of description, refer to FIG. 12. FIG. 12 is a schematic diagram of a normal map and an albedo map according to an embodiment of this application. The left figure is the normal map, and the right figure is the albedo map. The normal corresponding to each of the pixels in the normal map has components in three directions.

In this embodiment of this application, a method for generating the normal map and the albedo map according to the N difference images is provided. Through the method, the normal map and the albedo map of the difference images can be calculated based on light incident angles and pixel values, thereby further improving the enforceability of the solution.

In some embodiments, based on the foregoing embodiments corresponding to FIG. 3, in an embodiment of the face liveness detection method provided in this embodiment of this application, the calculating normals and albedos according to the first difference image, the second difference image, and the third difference image may include:

determining a first equation according to a target pixel in the first difference image;
determining a second equation according to a target pixel in the second difference image;
determining a third equation according to a target pixel in the third difference image, the target pixel in the first difference image, the target pixel in the second difference image, and the target pixel in the third difference image being corresponding to a same pixel position; and
calculating a normal of the target pixels and an albedo of the target pixels according to the first equation, the second equation, the third equation, and a fourth equation, the fourth equation representing a relationship among three direction components corresponding to the normal.

The generating the normal map according to the normals may include:

generating the normal map corresponding to the target pixels according to the normal of the target pixels.

The generating the albedo map according to the albedos may include:

generating the albedo map corresponding to the target pixels according to the albedo of the target pixels.

In this embodiment, the face liveness detection apparatus determines corresponding equations for pixels at the same position in the N difference images. Because there are at least three difference images, at least three equations may be obtained. With reference to a fourth equation in which a quadratic sum of three components of a normal is 1, a normal and an albedo of the pixels can be calculated. The foregoing operations are performed on the pixels in the difference images, so that the normals (where each of the normals includes three normal components) and the albedos of the pixels can be obtained, that is, the normal map and the albedo map are calculated.

Using target pixels in the first difference image, the second difference image, and the third difference image as an example, suppose positions of the target pixels are all (1, 1), which indicates that the position of the target pixel in the first difference image is (1, 1), the position of the target pixel in the second difference image is also (1, 1), and the position of the target pixel in the third difference image is (1, 1). However, the target pixels have different pixel values in different difference images. That is, the pixel value of the target pixel in the first difference image is $q_1^{11}$, the pixel value of the target pixel in the second difference image is $q_2^{11}$, and the pixel value of the target pixel in the third difference image is $q_3^{11}$, and based on this, the following equations may be simultaneously solved:

$$\begin{cases} \alpha^{11} * (n^{11} \cdot \lambda_1) = q_1^{11} \\ \alpha^{11} * (n^{11} \cdot \lambda_2) = q_2^{11} \\ \alpha^{11} * (n^{11} \cdot \lambda_3) = q_3^{11} \\ n_x^2 + n_y^2 + n_z^2 = 1 \end{cases}$$

where the first equation is $\alpha^{11}*(n^{11}\cdot\lambda_1)=q_1^{11}$, the second equation is $\alpha^{11}*(n^{11}\cdot\lambda_2)=q_2^{11}$, the third equation is $\alpha^{11}*(n^{11}\cdot\lambda_3)=q_3^{11}$, and the fourth equation is $n_x^2+n_y^2+n_z^2=1$. $\alpha^{11}$ represents an albedo of the target pixel, $n^{11}$ represents a normal of the target pixel, and $n_x$, $n_y$, and $n_z$ respectively represent three components of the normal $n^{11}$. $\lambda_1$ represents the first illumination direction corresponding to the first difference image, $\lambda_2$ represents the second illumination direction corresponding to the second difference image, and $\lambda_3$ represents the third illumination direction corresponding to the third difference image. $q_1^{11}$ represents the pixel value of the target pixel in the first difference image, $q_2^{11}$ represents the pixel value of the target pixel in the second difference image, and $q_3^{11}$ represents the pixel value of the target pixel in the third difference image.

The superscript 11 indicates that the position of the target pixel is (1, 1). Similarly, for each pixel, a superscript may be used for marking a specific position.

When the pixels in the difference images are calculated through the foregoing operations, the normal map and the albedo map can be obtained.

During actual application, the quantity of difference images is not limited to 3. Therefore, the following method may be used for calculation:

$$\begin{cases} \alpha^{xy} * (n^{xy} \cdot \lambda_1) = q_1^{xy} \\ \alpha^{xy} * (n^{xy} \cdot \lambda_2) = q_2^{xy} \\ \alpha^{xy} * (n^{xy} \cdot \lambda_3) = q_3^{xy} \\ \ldots \\ \alpha^{xy} * (n^{xy} \cdot \lambda_N) = q_N^{xy} \\ n_x^2 + n_y^2 + n_z^2 = 1 \end{cases}$$

where $\alpha^{xy}$ represents an albedo of a pixel at a position (x, y), $n^{xy}$ represents a normal of the pixel at the position (x, y), and $n_x$, $n_y$, and $n_z$ respectively represent three components of the normal $n^{xy}$, $\lambda_i$ represents an illumination direction of the $i^{th}$ face image, and $q_i^{xy}$ represents a pixel value of the $i^{th}$ face image at the position (x, y), where i is an integer greater than or equal to 1 and less than or equal to N.

In this embodiment of this application, a method for calculating the normal map and albedo map based on the pixels in the images is provided. Through the method, corresponding results can be accurately calculated for the pixels, thereby improving the feasibility and operability of the solution.

In some embodiments, based on the foregoing embodiments corresponding to FIG. 3, in an embodiment of the face liveness detection method provided in this embodiment of this application, the determining a face liveness detection result according to the N difference images, the normal map, and the albedo map may include:

obtaining a liveness probability corresponding to the to-be-recognized face based on the N difference images, the normal map, and the albedo map by using a liveness detection model, the to-be-recognized face being included in the initial face image and the face image set; and determining the face liveness detection result corresponding to the to-be-recognized face according to the liveness probability corresponding to the to-be-recognized face.

In this embodiment, a method for determining the face liveness probability by using the liveness detection model on the terminal device is provided. The face liveness detection apparatus inputs the calculated N difference images, the normal map, and the albedo map into the liveness detection model. The liveness detection model outputs a floating-point number between 0 and 1 based on the input data, and the floating-point number represents the probability that the face is a live face.

The liveness detection model may adopt a convolutional neural network (CNN), such as a residual neural network-50 (ResNet-50). The face liveness detection apparatus is deployed on the terminal device, and the terminal device is further deployed with a trained liveness detection model. The training of the liveness detection model may be performed on a server or another terminal device with a relatively strong computing capability. During training of the liveness detection model, live face sample images need to be acquired first, labels of the live face sample images are set to 1, non-live face sample images are acquired, and labels of the non-live face sample images are set to 0. In addition, N difference images, a normal map, and an albedo map that are corresponding to the live face sample images and N difference images, a normal map, and an albedo map that are corresponding to the non-live face sample images are acquired. The N difference image, the normal map, and the albedo map are spliced together to form a piece of data with a resolution of W*H and the quantity of channels of (3*N+3+1) as an input of a to-be-trained liveness detection model. A loss value between the marked real label and an actual output predicted label is used as supervision data for training the liveness detection model until the loss value of the liveness detection model converges, which indicates that the training of the liveness detection model is completed.

Figure 13:
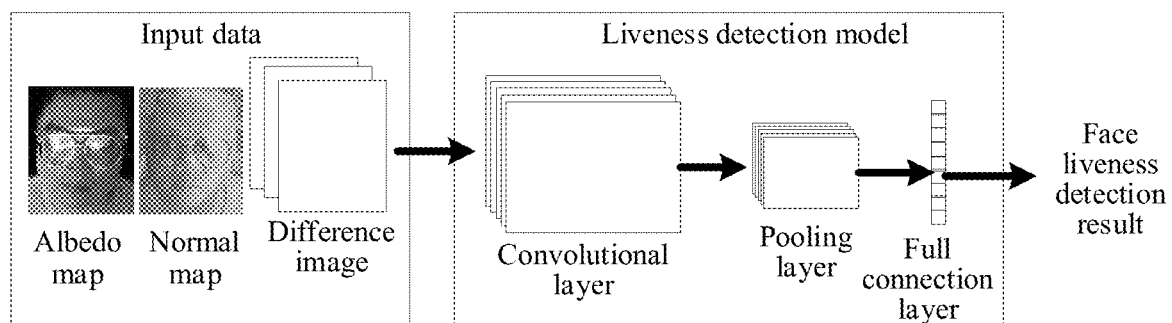
FIG. 13 is a schematic structural diagram of a liveness detection model according to an embodiment of this application.

For ease of description, refer to FIG. 13. FIG. 13 is a schematic structural diagram of a liveness detection model according to this embodiment of this application. As shown in the figure, N difference images, a normal map, and an albedo map are used as input data and inputted into the liveness detection model. The liveness detection model may include a convolutional layer, a pooling layer, and a full connection (FC) layer. The input data passes through the convolutional layer, the pooling layer, and the full connection layer, and outputs a floating-point number between 0 and 1. The floating-point number is used for indicating a probability that the input data is a live face, and a face liveness detection result may be determined based on an output probability value.

Although the figure only includes one convolutional layer and one pooling layer, the one convolutional layer and the one pooling layer are merely used as an example and are not to be understood as a limitation on this application. During actual application, the liveness detection model may include a plurality of convolutional layers and a plurality of pooling layers, and specific quantities may depend on an actual situation.

In this embodiment, a method for determining the face liveness probability by using the liveness detection model on the terminal device is provided. Through the method, the face liveness probability can be determined by using the terminal device without networking, thereby improving the flexibility of detection.

In some embodiments, based on the foregoing embodiments corresponding to FIG. 3, in an embodiment of the face liveness detection method provided in this embodiment of this application, the determining a face liveness detection result according to the N difference images, the normal map, and the albedo map may include:

transmitting the N difference images, the normal map, and the albedo map to a server, so that the server obtains a liveness probability corresponding to the to-be-recognized face based on the N difference images, the normal map, and the albedo map by using the liveness detection model, and determines the face liveness detection result corresponding to the to-be-recognized face according to the liveness probability corresponding to the to-be-recognized face, the to-be-recognized face being included in the initial face image and the face image set; and receiving the face liveness detection result transmitted by the server.

In this embodiment, a method for determining the face liveness probability by using the liveness detection model on the server is provided. The trained liveness detection model is deployed on the server. The face liveness detection apparatus transmits the calculated N difference images, the normal map, and the albedo map to the server. The server inputs the received data into the liveness detection model, and the liveness detection model outputs a floating-point number between 0 and 1 based on the input data. The floating-point number represents the probability that the face is a live face. The server finally transmits the face liveness detection result determined based on the floating-point number to the face liveness detection apparatus.

It is to be understood that, the training manner of the liveness detection model in this embodiment is similar to the training manner involved in the foregoing embodiments, and details are not described herein again.

In this embodiment, a method for determining the face liveness probability by using the liveness detection model on the server is provided. Through the method, the server determines the probability that the face is a live face by using the liveness detection model, thereby reducing hardware requirements for the terminal device and saving hardware costs of the terminal device. In addition, the server has a relatively strong computing capability and a high computing speed, thereby improving the efficiency of the method provided by this application.

Figure 14:
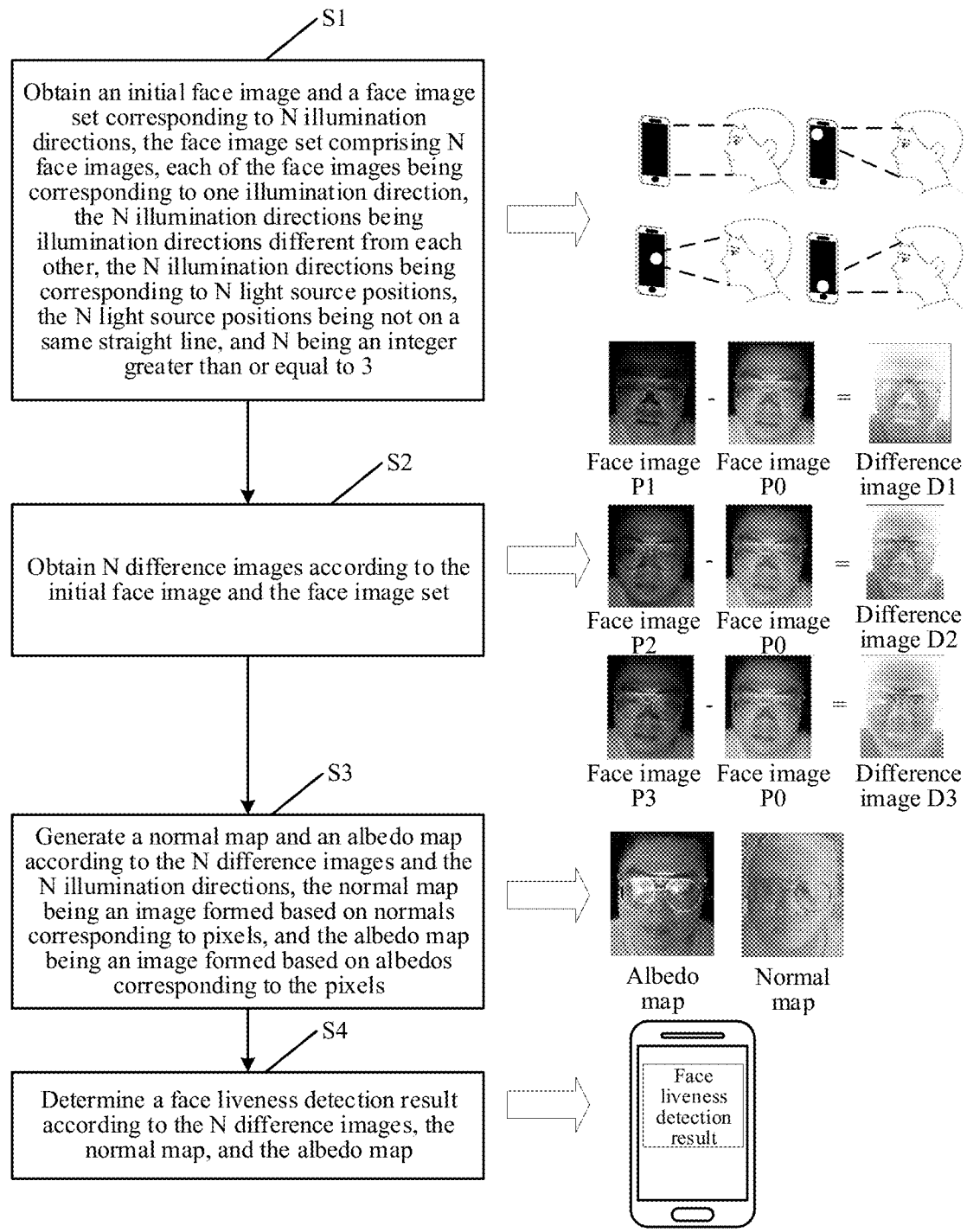
FIG. 14 is a schematic flowchart of face liveness detection according to an embodiment of this application.

An execution process of this embodiment of this application is described below with reference to actual application. FIG. 14 is a schematic flowchart of face liveness detection according to an embodiment of this application. As shown in the figure, face payment on a terminal device is used as an example. When a user performs face payment by using the terminal device, face liveness detection is triggered, which specifically includes the following steps:

Step S1: The terminal device first obtains an initial face image P0 under natural light, and then lights up N regions on the terminal device in sequence as light sources to provide illuminations from N different directions, where each time one light source is enabled, one face image may be acquired, and supposing N is 3, a first face image P1, a second face image P2, and a third face image P3 may be acquired.

Step S2: The terminal device subtracts the initial face image P0 from the first face image P1 to obtain a first difference image D1, and similarly, subtracts the initial face image P0 from the second face image P2 to obtain the second difference image D2, and subtracts the initial face image P0 from the third face image P3 to obtain the third difference image D3.

Step S3: The terminal device calculates a normal map and an albedo map based on the first difference image D1, the second difference image D2, the third difference image D3, and the N different directions.

Step S4: The terminal device inputs the first difference image D1, the second difference image D2, the third difference image D3, the normal map, and the albedo map into a liveness detection model, so that the liveness detection model outputs a face liveness detection result, the face liveness detection result indicating that an acquired face is a live face or a non-live face, and the terminal device displays the generated face liveness detection result.

Figure 15:
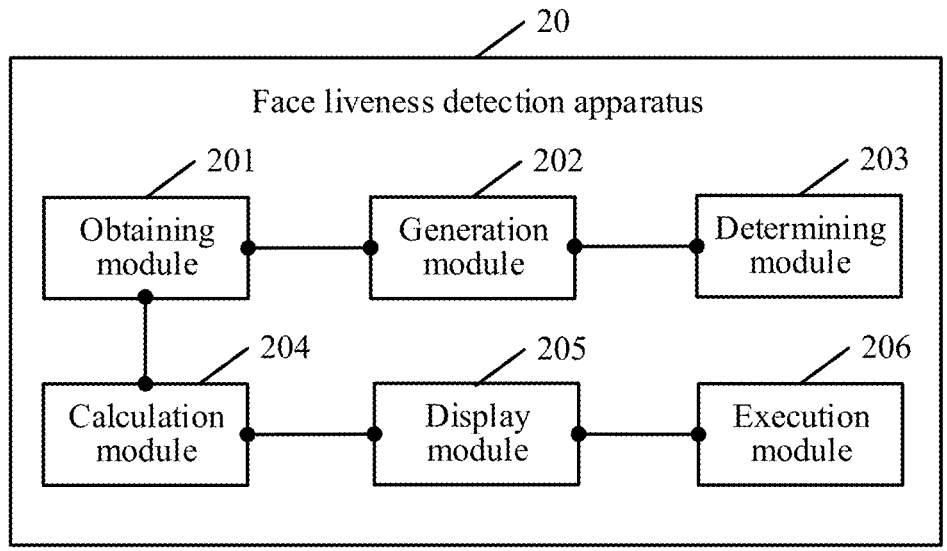
FIG. 15 is a schematic diagram of an embodiment of a face liveness detection apparatus according to an embodiment of this application.

A face liveness detection apparatus in this application is described below in detail. FIG. 15 is a schematic diagram of an embodiment of a face liveness detection apparatus according to an embodiment of this application. The face liveness detection apparatus 20 includes:

an obtaining module 201, configured to obtain an initial face image of an object and a face image set of the object, the face image set comprising N face images of the object captured according to N illumination directions, the N illumination directions corresponding to N light source positions, the N light source positions being not on a same straight line, and N being an integer greater than or equal to 3, the obtaining module 201 being further configured to obtain N difference images according to the initial face image and the N face images in the face image set;

a generation module 202, configured to generate a normal map and an albedo map according to the N difference images and the N illumination directions, the normal map being an image formed based on normals corresponding to pixels, and the albedo map being an image formed based on albedos corresponding to the pixels; and a determining module 203, configured to determine a face liveness detection result according to the N difference images obtained by the obtaining module and the normal map and the albedo map generated by the generation module. The face liveness detection result indicates whether the object has a live face or not.

In some embodiments, based on the embodiment corresponding to FIG. 15, in another embodiment of the face liveness detection apparatus 20 provided in this embodiment of this application, the face image set includes at least a first face image, a second face image, and a third face image.

The obtaining module 201 is specifically configured to obtain the initial face image;

obtain the first face image at a first moment that is within a target duration;

obtain the second face image at a second moment that is within the target duration, the second moment and the first moment being different moments; and obtain the third face image at a third moment that is within the target duration, the third moment and the first moment being different moments, and the third moment and the second moment being different moments.

In some embodiments, based on the embodiment corresponding to FIG. 15, in another embodiment of the face liveness detection apparatus 20 provided in this embodiment of this application, the face image set includes at least a first face image, a second face image, and a third face image.

The N illumination directions include at least a first illumination direction, a second illumination direction, and a third illumination direction, the first illumination direction, the second illumination direction, and the third illumination direction being different from each other.

The obtaining module 201 is specifically configured to obtain the initial face image;
  obtain the first face image in the first illumination direction;
  obtain the second face image in the second illumination direction; and
  obtain the third face image in the third illumination direction.

In some embodiments, based on the embodiment corresponding to FIG. 15, in another embodiment of the face liveness detection apparatus 20 provided in this embodiment of this application, the N light source positions include at least a first light source position, a second light source position, and a third light source position. The first light source position, the second light source position, and the third light source position are not on the same straight line.

The obtaining module 201 is specifically configured to acquire the first face image in the first illumination direction when a first screen region of a terminal device is lit up, the first screen region being at the first light source position, and the first illumination direction being a corresponding direction when the first screen region is lit up to illuminate a to-be-recognized face;
  acquire the second face image in the second illumination direction when a second screen region of the terminal device is lit up, the second screen region being at the second light source position, and the second illumination direction being a corresponding direction when the second screen region is lit up to illuminate the to-be-recognized face; and
  acquire the third face image in the third illumination direction when a third screen region of the terminal device is lit up, the third screen region being at the third light source position, and the third illumination direction being a corresponding direction when the third screen region is lit up to illuminate the to-be-recognized face.

In some embodiments, based on the embodiment corresponding to FIG. 15, in another embodiment of the face liveness detection apparatus 20 provided in this embodiment of this application, the N light source positions include at least a first light source position, a second light source position, and a third light source position. The first light source position, the second light source position, and the third light source position are not on the same straight line.

The obtaining module 201 is specifically configured to acquire the first face image in the first illumination direction when a first light-emitting region is lit up, the first light-emitting region being at the first light source position, and the first illumination direction being a corresponding direction when the first light-emitting region is lit up to illuminate a to-be-recognized face;
  acquire the second face image in the second illumination direction when a second light-emitting region is lit up, the second light-emitting region being at the second light source position, and the second illumination direction being a corresponding direction when the second light-emitting region is lit up to illuminate the to-be-recognized face; and
  acquire the third face image in the third illumination direction when a third light-emitting region is lit up, the third light-emitting region being at the third light source position, and the third illumination direction being a corresponding direction when the third light-emitting region is lit up to illuminate the to-be-recognized face.

In some embodiments, based on the embodiment corresponding to FIG. 15, in another embodiment of the face liveness detection apparatus 20 provided in this embodiment of this application, the face image set includes at least a first face image, a second face image, and a third face image.

The obtaining module 201 is specifically configured to perform face key point detection on the initial face image to obtain an initial face key point set, the initial face key point set including a plurality of initial face key points;
  perform face key point detection on the first face image to obtain a first face key point set, the first face key point set including a plurality of first face key points;
  perform face key point detection on the second face image to obtain a second face key point set, the second face key point set including a plurality of second face key points;
  perform face key point detection on the third face image to obtain a third face key point set, the third face key point set including a plurality of third face key points;
  generate a first difference image according to the initial face key point set and the first face key point set, the first difference image being one of the N difference images;
  generate a second difference image according to the initial face key point set and the second face key point set, the second difference image being a difference image different from the first difference image in the N difference images; and
  generate a third difference image according to the initial face key point set and the third face key point set, the third difference image being a difference image different from the first difference image and the second difference image in the N difference images.

In some embodiments, based on the embodiment corresponding to FIG. 15, in another embodiment of the face liveness detection apparatus 20 provided in this embodiment of this application, the face liveness detection apparatus 20 further includes a calculation module 204, a display module 205, and an execution module 206.

The calculation module 204 is configured to calculate a first key point offset according to the initial face key point set and the first face key point set.

The calculation module 204 is further configured to calculate a second key point offset according to the initial face key point set and the second face key point set.

The calculation module 204 is further configured to calculate a third key point offset according to the initial face key point set and the third face key point set.

The display module 205 is configured to display a prompt message for re-acquisition when at least one of the first key point offset, the second key point offset, or the third key point offset is greater than or equal to an offset threshold.

The execution module 206 is configured to perform, when the first key point offset, the second key point offset, and the third key point offset are all less than the offset threshold, the operations of generating a first difference image according to the initial face key point set and the first face key point set, generate a second difference image according to the initial face key point set and the second face key point set, and generate a third difference image according to the initial face key point set and the third face key point set.

In some embodiments, based on the embodiment corresponding to FIG. 15, in another embodiment of the face liveness detection apparatus 20 provided in this embodiment of this application, the obtaining module 201 is specifically configured to determine a first transformation matrix according to the initial face key point set and the first face key point set;
align the first face image based on the first transformation matrix and the initial face image to obtain the aligned first face image; and
generate the first difference image according to the aligned first face image and the initial face image.

The obtaining module 201 is specifically configured to determine a second transformation matrix according to the initial face key point set and the second face key point set;
align the second face image based on the second transformation matrix and the initial face image to obtain the aligned second face image; and
generate the second difference image according to the aligned second face image and the initial face image.

The obtaining module 201 is specifically configured to determine a third transformation matrix according to the initial face key point set and the third face key point set;
align the third face image based on the third transformation matrix and the initial face image to obtain the aligned third face image; and
generate the third difference image according to the aligned third face image and the initial face image.

In some embodiments, based on the foregoing embodiment corresponding to FIG. 15, in another embodiment of the face liveness detection apparatus 20 provided in this embodiment of this application, the generation module 202 is specifically configured to calculate normals and albedos according to the first difference image, the second difference image, and the third difference image;
generate the normal map according to the normals; and
generate the albedo map according to the albedos.

In some embodiments, based on the embodiment corresponding to FIG. 15, in another embodiment of the face liveness detection apparatus 20 provided in this embodiment of this application, the generation module 202 is specifically configured to determine a first equation according to a target pixel in the first difference image;
determine a second equation according to a target pixel in the second difference image;
determine a third equation according to a target pixel in the third difference image, the target pixel in the first difference image, the target pixel in the second difference image, and the target pixel in the third difference image being corresponding to a same pixel position; and
calculate a normal of the target pixels and an albedo of the target pixels according to the first equation, the second equation, the third equation, and a fourth equation, the fourth equation representing a relationship among three direction components corresponding to the normal.

The generation module 202 is specifically configured to generate the normal map corresponding to the target pixels according to the normal of the target pixels.

The generation module 202 is specifically configured to generate the albedo map corresponding to the target pixels according to the albedo of the target pixels.

In some embodiments, based on the embodiment corresponding to FIG. 15, in another embodiment of the face liveness detection apparatus 20 provided in this embodiment of this application, the determining module 203 is specifically configured to obtain a liveness probability corresponding to the to-be-recognized face based on the N difference images, the normal map, and the albedo map by using a liveness detection model, the to-be-recognized face being included in the initial face image and the face image set; and
determine the face liveness detection result corresponding to the to-be-recognized face according to the liveness probability corresponding to the to-be-recognized face.

In some embodiments, based on the embodiment corresponding to FIG. 15, in another embodiment of the face liveness detection apparatus 20 provided in this embodiment of this application, the determining module 203 is specifically configured to transmit the N difference images, the normal map, and the albedo map to a server, so that the server obtains a liveness probability corresponding to the to-be-recognized face based on the N difference images, the normal map, and the albedo map by using the liveness detection model, and determines the face liveness detection result corresponding to the to-be-recognized face according to the liveness probability corresponding to the to-be-recognized face, the to-be-recognized face being included in the initial face image and the face image set; and
receive the face liveness detection result transmitted by the server.

Figure 16:
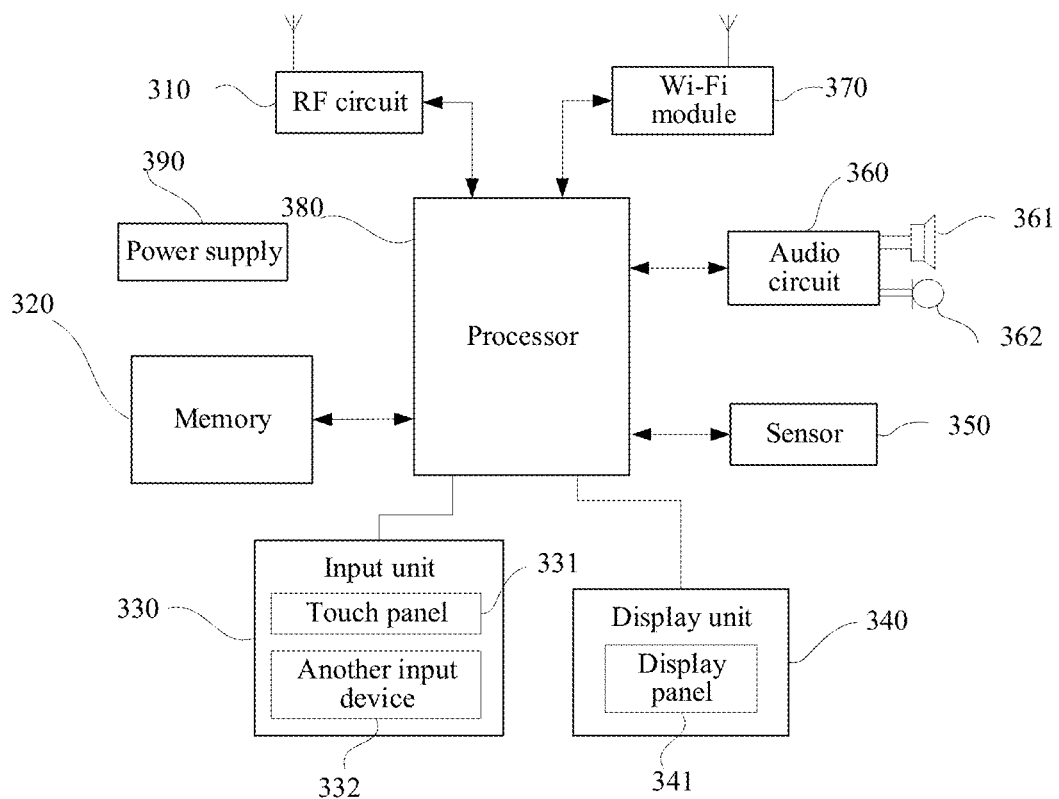
FIG. 16 is a block diagram of partial structure of a mobile phone related to a terminal device according to an embodiment of this application.

The embodiments of this application further provide a face liveness detection apparatus. The face liveness detection apparatus may be deployed on an electronic device. A terminal device is used as an example of the electronic device, that is, the face liveness detection apparatus provided in the embodiments corresponding to FIG. 15 may be deployed on the terminal device to perform the steps described in FIG. 3. As shown in FIG. 16, for ease of description, only parts related to the embodiments of this application are shown. For specific technical details that are not disclosed, refer to the method part in the embodiments of this application. The terminal device may be any terminal device including a mobile phone, a tablet computer, a personal digital assistant (PDA), a point of sales (POS), and an on-board computer, and a mobile phone is used as an example of the terminal device.

FIG. 16 is a block diagram of partial structure of a mobile phone related to a terminal device according to an embodiment of this application. Referring to FIG. 16, the mobile phone includes components such as a radio frequency (RF) circuit 310, a memory 320, an input unit 330, a display unit 340, a sensor 350, an audio circuit 360, a wireless fidelity (Wi-Fi) module 370, a processor 380, and a power supply 390. A person skilled in the art can understand that the structure of the mobile phone shown in FIG. 16 does not constitute a limitation to the mobile phone, and the mobile phone may include more components or fewer components than those shown in the figure, or some components may be combined, or a different component deployment may be used.

The components of the mobile phone are described in detail below with reference to FIG. 16.

The RF circuit 310 may be configured to send and receive signals during an information receiving and sending process or a call process. Particularly, the RF circuit receives downlink information from a base station, then delivers the downlink information to the processor 380 for processing, and sends designed uplink data to the base station. Generally, the RF circuit 310 includes but is not limited to an antenna, at least one amplifier, a transceiver, a coupler, a low noise amplifier (LNA), a duplexer, and the like. In addition, the RF circuit 310 may also communicate with a network and another device through wireless communication. The wireless communication may use any communication standard or protocol, including, but not limited to, Global System for Mobile Communications (Global System of Mobile communications, GSM), General Packet Radio Service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), email, Short Messaging Service (Short Messaging Service, SMS), and the like.

The memory 320 may be configured to store a software program and a module. The processor 380 runs the software program and the module that are stored in the memory 320, to implement various functional applications and data processing of the mobile phone. The memory 320 may mainly include a program storage area and a data storage area. The program storage area may store an operating system, an application program required by at least one function (for example, a sound playback function and an image display function), and the like. The data storage area may store data (for example, audio data and an address book) created according to the use of the mobile phone, and the like. In addition, the memory 320 may include a high speed RAM, and may further include a non-volatile memory, such as at least one magnetic disk storage device, a flash memory, or another volatile solid storage device.

The input unit 330 may be configured to receive inputted digit or character information, and generate a keyboard signal input related to the user setting and function control of the mobile phone. Specifically, the input unit 330 may include a touch panel 331 and another input device 332. The touch panel 331, which may also be referred to as a touch screen, may collect a touch operation of a user on or near the touch panel (such as an operation of a user on or near the touch panel 331 by using any suitable object or accessory such as a finger or a stylus), and drive a corresponding connection apparatus according to a preset program. In some embodiments, the touch panel 331 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and transmits the touch point coordinates to the processor 380. In addition, the touch controller can receive a command transmitted by the processor 380 and execute the command. In addition, the touch panel 331 may be implemented by using various types, such as a resistive type, a capacitance type, an infrared type, and a surface acoustic wave type. In addition to the touch panel 331, the input unit 330 may further include the another input device 332. Specifically, the another input device 332 may include, but is not limited to, one or more of a physical keyboard, a functional key (such as a volume control key or a switch key), a track ball, a mouse, and a joystick.

The display unit 340 may be configured to display information inputted by the user or information provided for the user, and various menus of the mobile phone. The display unit 340 may include a display panel 341. In some embodiments, the display panel 341 may be configured in the form of a liquid crystal display (LCD), an organic light-emitting diode (OLED), or the like. Further, the touch panel 331 may cover the display panel 341. After detecting a touch operation on or near the touch panel, the touch panel 331 transfers the touch operation to the processor 380, to determine a type of a touch event. Then, the processor 380 provides a corresponding visual output on the display panel 341 according to the type of the touch event. Although in FIG. 16, the touch panel 331 and the display panel 341 are used as two separate parts to implement input and output functions of the mobile phone, in some embodiments, the touch panel 331 and the display panel 341 may be integrated to implement the input and output functions of the mobile phone.

The mobile phone may further include at least one sensor 350 such as an optical sensor, a motion sensor, and other sensors. Specifically, the optical sensor may include an ambient light sensor and a proximity sensor, where the ambient light sensor may adjust luminance of the display panel 341 according to the luminance of the ambient light, and the proximity sensor may switch off the display panel 341 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 360, a loudspeaker 361, and a microphone 362 may provide audio interfaces between the user and the mobile phone. The audio circuit 360 may convert received audio data into an electric signal and transmit the electric signal to the loudspeaker 361. The loudspeaker 361 converts the electric signal into a sound signal for output. On the other hand, the microphone 362 converts a collected sound signal into an electric signal. The audio circuit 360 receives the electric signal and converts the electric signal into audio data, and outputs the audio data to the processor 380 for processing. Then, the processor 380 sends the audio data to, for example, another apparatus by using the RF circuit 310, or outputs the audio data to the memory 320 for further processing.

Wi-Fi is a short distance wireless transmission technology. The mobile phone may help, by using the Wi-Fi module 370, a user receives and transmits an email, browse a web page, access stream media, and the like. This provides wireless broadband Internet access for the user. Although FIG. 16 shows the Wi-Fi module 370, it may be understood that the Wi-Fi module is not a necessary component of the mobile phone, and the Wi-Fi module may be omitted as required provided that the scope of the essence of the present disclosure is not changed.

The processor 380 is the control center of the mobile phone, and is connected to various parts of the mobile phone by using various interfaces and lines. By running or executing the software program and/or module stored in the memory 320, and invoking data stored in the memory 320, the processor performs various functions and data processing of the mobile phone, thereby performing overall monitoring on the mobile phone. In some embodiments, the processor 380 may include one or more processing units. In some embodiments, the processor 380 may integrate an application processor and a modem processor, where the application processor mainly processes an operating system, a user interface, an application program, and the like, and the modem processor mainly processes wireless communications. It may be understood that the modem may either not be integrated into the processor 380.

The mobile phone further includes the power supply 390 (such as a battery) for supplying power to the components. In some embodiments, the power supply may be logically connected to the processor 380 by using a power management system, thereby implementing functions such as charging, discharging and power consumption management by using the power management system.

Although not shown in the figure, the mobile phone may further include a camera, a Bluetooth module, and the like, which are not further described herein.

In this embodiment of this application, the processor 380 included in the terminal device further has the following functions:

executing the program in the memory to implement the face liveness detection method described in the foregoing embodiments described in FIG. 3 to FIG. 13.

The embodiments of this application further provide a computer-readable storage medium, the computer-readable storage medium storing a computer program, the computer program, when run on a computer, causing the computer to perform the steps performed by the terminal device in the method described in the embodiments described in FIG. 3 to FIG. 13, or causing the computer program to perform the steps performed by the terminal device in the method described in the embodiment described in FIG. 15.

The embodiments of this application further provide a computer program product including a program, the computer program product, when run on a computer, causing the computer to perform the steps performed by the terminal device in the method described in the embodiments described in FIG. 3 to FIG. 13, or causing the computer program to perform the steps performed by the terminal device in the method described in the embodiment described in FIG. 15.

Persons skilled in the art can clearly understand that for convenience and conciseness of description, for specific working processes of the foregoing described system, apparatus and unit, reference may be made to the corresponding processes in the foregoing method embodiments, and details are not described herein.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. In the several embodiments provided in this application, the disclosed system, apparatus, and method may be implemented in other manners. For example, the described apparatus embodiment is merely exemplary. For example, the unit division is merely a logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to an actual requirement to achieve the objectives of the solutions in the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing embodiments are merely intended for describing the technical solutions of this application, but not for limiting this application. Although this application is described in detail with reference to the foregoing embodiments, persons of ordinary skill in the art are to understand that they may still make modifications to the technical solutions described in the foregoing embodiments or make equivalent replacements to some technical features thereof, without departing from the spirit and scope of the technical solutions of the embodiments of this application.

What is claimed is:

1. A face liveness detection method performed by an electronic device, the method comprising:

obtaining an initial face image of an object captured in natural light or under illumination of a plurality of light sources;

obtaining a face image set of the object, the face image set comprising N face images of the object captured according to N illumination directions, the N illumination directions corresponding to N light source positions, the N light source positions being not on a same straight line, and N being an integer greater than or equal to 3;

obtaining N difference images according to the initial face image and the N face images in the face image set, wherein each of the N difference images includes pixel value differences of the initial face image and a respective image in the face image set;

generating a normal map and an albedo map according to the N difference images and the N illumination directions, the normal map being an image formed based on normals corresponding to pixels, and the albedo map being an image formed based on albedos corresponding to the pixels; and determining a face liveness detection result according to the N difference images, the normal map, and the albedo map, wherein the face liveness detection result indicates whether the object has a live face or not.

2. The method according to claim 1, wherein the face image set comprises at least a first face image of the object, a second face image of the object, and a third face image of the object, and the obtaining an initial face image of an object and a face image set of the object comprises:
obtaining the initial face image;
obtaining the first face image at a first moment that is within a target duration;
obtaining the second face image at a second moment that is within the target duration; and
obtaining the third face image at a third moment that is within the target duration, the first moment, the second moment and the third moment being three different moments within the target duration.

3. The method according to claim 1, wherein:
the face image set comprises at least a first face image of the object, a second face image of the object, and a third face image of the object;
the N illumination directions comprise at least a first illumination direction, a second illumination direction, and a third illumination direction, the first illumination direction, the second illumination direction, and the third illumination direction being different from each other; and
the obtaining an initial face image of an object and a face image set of the object comprises:
obtaining the initial face image;
obtaining the first face image in the first illumination direction;
obtaining the second face image in the second illumination direction; and
obtaining the third face image in the third illumination direction.

4. The method according to claim 3, wherein:
the N light source positions comprise at least a first light source position, a second light source position, and a third light source position;
the obtaining the first face image in the first illumination direction comprises acquiring the first face image in the first illumination direction when a first screen region of a terminal device is lit up, the first screen region being at the first light source position, and the first illumination direction being a corresponding direction when the first screen region is lit up to illuminate a to-be-recognized face;
the obtaining the second face image in the second illumination direction comprises acquiring the second face image in the second illumination direction when a second screen region of the terminal device is lit up, the second screen region being at the second light source position, and the second illumination direction being a corresponding direction when the second screen region is lit up to illuminate the to-be-recognized face; and
the obtaining the third face image in the third illumination direction comprises acquiring the third face image in the third illumination direction when a third screen region of the terminal device is lit up, the third screen region being at the third light source position, and the third illumination direction being a corresponding direction when the third screen region is lit up to illuminate the to-be-recognized face.

5. The method according to claim 3, wherein:
the N light source positions comprise at least a first light source position, a second light source position, and a third light source position, and the first light source position, the second light source position, and the third light source position are not on a same straight line;
the obtaining the first face image in the first illumination direction comprises acquiring the first face image in the first illumination direction when a first light-emitting region is lit up, the first light-emitting region being at the first light source position, and the first illumination direction being a corresponding direction when the first light-emitting region is lit up to illuminate a to-be-recognized face;
the obtaining the second face image in the second illumination direction comprises acquiring the second face image in the second illumination direction when a second light-emitting region is lit up, the second light-emitting region being at the second light source position, and the second illumination direction being a corresponding direction when the second light-emitting region is lit up to illuminate the to-be-recognized face; and
the obtaining the third face image in the third illumination direction comprises acquiring the third face image in the third illumination direction when a third light-emitting region is lit up, the third light-emitting region being at the third light source position, and the third illumination direction being a corresponding direction when the third light-emitting region is lit up to illuminate the to-be-recognized face.

6. The method according to claim 1, wherein:
the face image set comprises at least a first face image of the object, a second face image of the object, and a third face image of the object; and
the obtaining N difference images according to the initial face image and the N face images in the face image set comprises:
performing face key point detection on the initial face image to obtain an initial face key point set, the initial face key point set comprising a plurality of initial face key points;
performing face key point detection on the first face image to obtain a first face key point set, the first face key point set comprising a plurality of first face key points;
performing face key point detection on the second face image to obtain a second face key point set, the second face key point set comprising a plurality of second face key points;
performing face key point detection on the third face image to obtain a third face key point set, the third face key point set comprising a plurality of third face key points;
generating a first difference image according to the initial face key point set and the first face key point set, the first difference image being one of the N difference images;
generating a second difference image according to the initial face key point set and the second face key point set, the second difference image being a difference image different from the first difference image in the N difference images; and
generating a third difference image according to the initial face key point set and the third face key point set, the third difference image being a difference image different from the first difference image and the second difference image in the N difference images.

7. The method according to claim 6, further comprising:
calculating a first key point offset according to the initial face key point set and the first face key point set;
calculating a second key point offset according to the initial face key point set and the second face key point set;
calculating a third key point offset according to the initial face key point set and the third face key point set;
displaying a prompt message for re-acquisition when at least one of the first key point offset, the second key point offset, or the third key point offset is greater than or equal to an offset threshold; and
performing, when the first key point offset, the second key point offset, and the third key point offset are all less than the offset threshold, the operations of generating a first difference image according to the initial face key point set and the first face key point set, generating a second difference image according to the initial face key point set and the second face key point set, and generating a third difference image according to the initial face key point set and the third face key point set.

8. The method according to claim 6, wherein:
the generating a first difference image according to the initial face key point set and the first face key point set comprises:
determining a first transformation matrix according to the initial face key point set and the first face key point set;
aligning the first face image based on the first transformation matrix with the initial face image to obtain the aligned first face image; and
generating the first difference image according to the aligned first face image and the initial face image;
the generating a second difference image according to the initial face key point set and the second face key point set comprises:
determining a second transformation matrix according to the initial face key point set and the second face key point set;
aligning the second face image based on the second transformation matrix with the initial face image to obtain the aligned second face image; and
generating the second difference image according to the aligned second face image and the initial face image; and
the generating a third difference image according to the initial face key point set and the third face key point set comprises:
determining a third transformation matrix according to the initial face key point set and the third face key point set;
aligning the third face image based on the third transformation matrix with the initial face image to obtain the aligned third face image; and
generating the third difference image according to the aligned third face image and the initial face image.

9. The method according to claim 6, wherein the generating a normal map and an albedo map according to the N difference images comprises:
calculating normals and albedos according to the first difference image, the second difference image, and the third difference image;
generating the normal map according to the normals; and
generating the albedo map according to the albedos.

10. The method according to claim 9, wherein:
the calculating normals and albedos according to the first difference image, the second difference image, and the third difference image comprises:
determining a first equation according to a target pixel in the first difference image;
determining a second equation according to a target pixel in the second difference image;
determining a third equation according to a target pixel in the third difference image, the target pixel in the first difference image, the target pixel in the second difference image, and the target pixel in the third difference image being corresponding to a same pixel position; and
calculating a normal of the target pixels and an albedo of the target pixels according to the first equation, the second equation, the third equation, and a fourth equation, the fourth equation representing a relationship among three direction components corresponding to the normal;
the generating the normal map according to the normals comprises generating the normal map corresponding to the target pixels according to the normal of the target pixels; and
the generating the albedo map according to the albedos comprises generating the albedo map corresponding to the target pixels according to the albedo of the target pixels.

11. The method according to claim 1, wherein the determining a face liveness detection result according to the N difference images, the normal map, and the albedo map comprises:
obtaining a liveness probability corresponding to a to-be-recognized face based on the N difference images, the normal map, and the albedo map by using a liveness detection model, the to-be-recognized face being comprised in the initial face image and the face image set; and
determining the face liveness detection result corresponding to the to-be-recognized face according to the liveness probability corresponding to the to-be-recognized face.

12. The method according to claim 1, wherein the determining a face liveness detection result according to the N difference images, the normal map, and the albedo map comprises:
transmitting the N difference images, the normal map, and the albedo map to a server, so that the server obtains a liveness probability corresponding to a to-be-recognized face based on the N difference images, the normal map, and the albedo map by using the liveness detection model, and determines the face liveness detection result corresponding to the to-be-recognized face according to the liveness probability corresponding to the to-be-recognized face, the to-be-recognized face being comprised in the initial face image and the face image set; and
receiving the face liveness detection result transmitted by the server.

13. An electronic device, comprising: a memory, and a processor,
the memory being configured to store a plurality of computer programs,
the processor being configured to execute the plurality of computer programs in the memory to perform a face liveness detection method including:

obtaining an initial face image of an object captured in natural light or under illumination of a plurality of light sources;

obtaining a face image set of the object, the face image set comprising N face images of the object captured according to N illumination directions, the N illumination directions corresponding to N light source positions, the N light source positions being not on a same straight line, and N being an integer greater than or equal to 3;

obtaining N difference images according to the initial face image and the N face images in the face image set, wherein each of the N difference images includes pixel value differences of the initial face image and a respective image in the face image set;

generating a normal map and an albedo map according to the N difference images and the N illumination directions, the normal map being an image formed based on normals corresponding to pixels, and the albedo map being an image formed based on albedos corresponding to the pixels; and determining a face liveness detection result according to the N difference images, the normal map, and the albedo map, wherein the face liveness detection result indicates whether the object has a live face or not.

14. The electronic device according to claim 13, wherein the face image set comprises at least a first face image of the object, a second face image of the object, and a third face image of the object, and the obtaining an initial face image of an object and a face image set of the object comprises:

obtaining the initial face image;
obtaining the first face image at a first moment that is within a target duration;
obtaining the second face image at a second moment that is within the target duration; and
obtaining the third face image at a third moment that is within the target duration, the first moment, the second moment and the third moment being three different moments within the target duration.

15. The electronic device according to claim 13, wherein:
the face image set comprises at least a first face image of the object, a second face image of the object, and a third face image of the object;
the N illumination directions comprise at least a first illumination direction, a second illumination direction, and a third illumination direction, the first illumination direction, the second illumination direction, and the third illumination direction being different from each other; and
the obtaining an initial face image of an object and a face image set of the object comprises:
obtaining the initial face image;
obtaining the first face image in the first illumination direction;
obtaining the second face image in the second illumination direction; and
obtaining the third face image in the third illumination direction.

16. The electronic device according to claim 13, wherein the determining a face liveness detection result according to the N difference images, the normal map, and the albedo map comprises:

obtaining a liveness probability corresponding to a to-be-recognized face based on the N difference images, the normal map, and the albedo map by using a liveness detection model, the to-be-recognized face being comprised in the initial face image and the face image set; and determining the face liveness detection result corresponding to the to-be-recognized face according to the liveness probability corresponding to the to-be-recognized face.

17. The electronic device according to claim 13, wherein the determining a face liveness detection result according to the N difference images, the normal map, and the albedo map comprises:

transmitting the N difference images, the normal map, and the albedo map to a server, so that the server obtains a liveness probability corresponding to a to-be-recognized face based on the N difference images, the normal map, and the albedo map by using the liveness detection model, and determines the face liveness detection result corresponding to the to-be-recognized face according to the liveness probability corresponding to the to-be-recognized face, the to-be-recognized face being comprised in the initial face image and the face image set; and receiving the face liveness detection result transmitted by the server.

18. A non-transitory computer-readable storage medium, configured to store a plurality of computer programs, the computer programs, when executed by a processor of an electronic device, causing the electronic device to perform a face liveness detection method including:

obtaining an initial face image of an object captured in natural light or under illumination of a plurality of light sources;

obtaining a face image set of the object, the face image set comprising N face images of the object captured according to N illumination directions, the N illumination directions corresponding to N light source positions, the N light source positions being not on a same straight line, and N being an integer greater than or equal to 3;

obtaining N difference images according to the initial face image and the N face images in the face image set, wherein each of the N difference images includes pixel value differences of the initial face image and a respective image in the face image set;

generating a normal map and an albedo map according to the N difference images and the N illumination directions, the normal map being an image formed based on normals corresponding to pixels, and the albedo map being an image formed based on albedos corresponding to the pixels; and determining a face liveness detection result according to the N difference images, the normal map, and the albedo map, wherein the face liveness detection result indicates whether the object has a live face or not.

19. The non-transitory computer-readable storage medium according to claim 18, wherein the face image set comprises at least a first face image of the object, a second face image of the object, and a third face image of the object, and the obtaining an initial face image of an object and a face image set of the object comprises:

obtaining the initial face image;
obtaining the first face image at a first moment that is within a target duration;
obtaining the second face image at a second moment that is within the target duration; and
obtaining the third face image at a third moment that is within the target duration, the first moment, the second moment and the third moment being three different moments within the target duration.

20. The non-transitory computer-readable storage medium according to claim 18, wherein the determining a face liveness detection result according to the N difference images, the normal map, and the albedo map comprises:
- obtaining a liveness probability corresponding to a to-be-recognized face based on the N difference images, the normal map, and the albedo map by using a liveness detection model, the to-be-recognized face being comprised in the initial face image and the face image set; and
- determining the face liveness detection result corresponding to the to-be-recognized face according to the liveness probability corresponding to the to-be-recognized face.

\* \* \* \* \*